INVENTOR.
Ernest E. Wemp

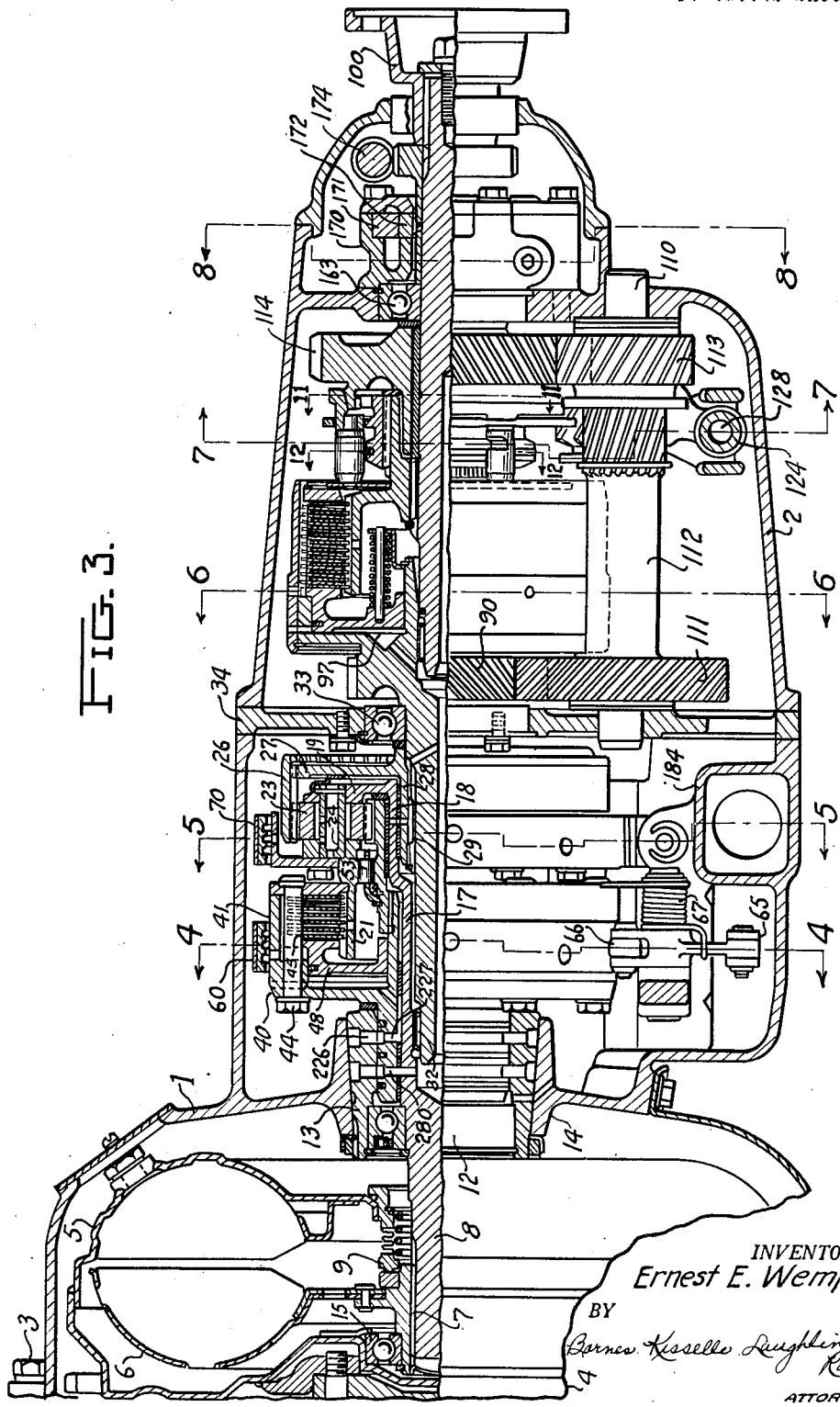

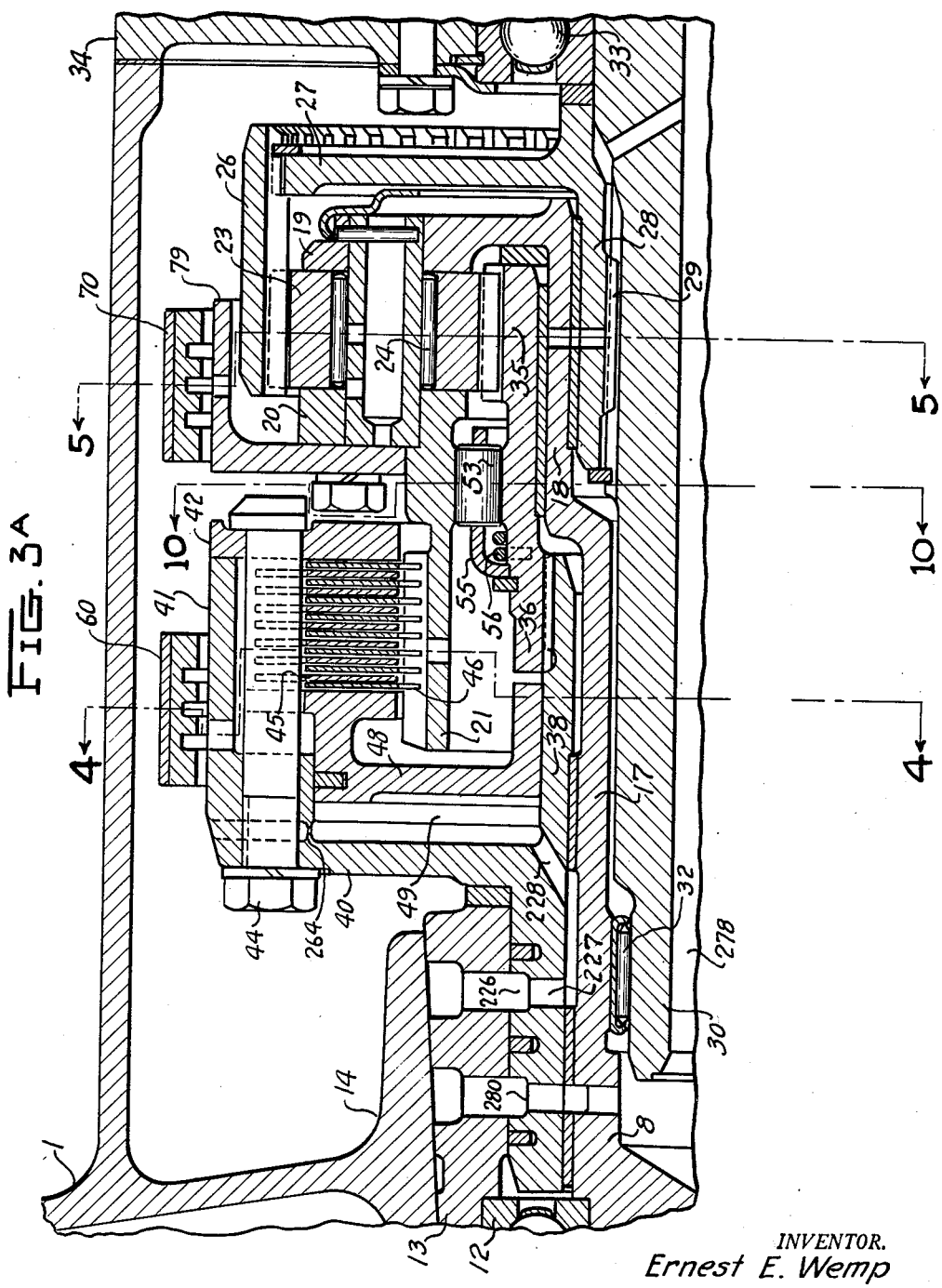

June 3, 1952 — E. E. WEMP — 2,599,215
AUTOMATIC TRANSMISSION
Filed Oct. 18, 1950 — 17 Sheets-Sheet 4

INVENTOR.
Ernest E. Wemp
BY Barnes, Kisselle, Laughlin & Raisch
ATTORNEYS

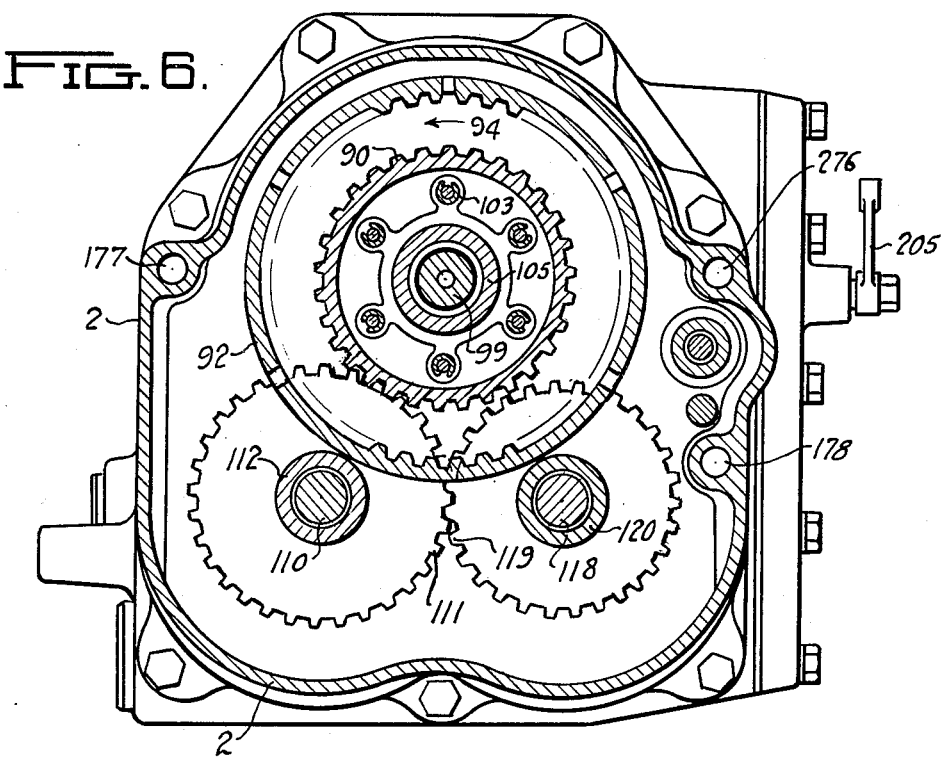
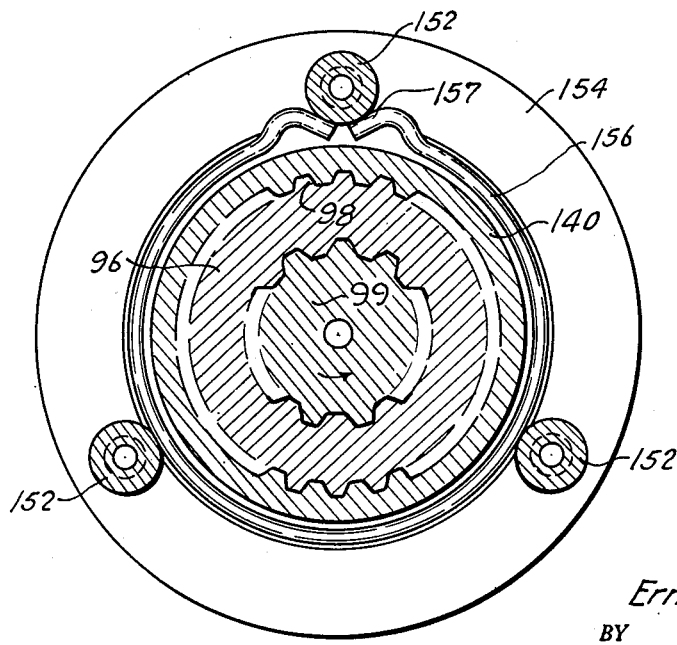

June 3, 1952 E. E. WEMP 2,599,215
AUTOMATIC TRANSMISSION
Filed Oct. 18, 1950 17 Sheets-Sheet 6

INVENTOR.
Ernest E. Wemp
BY
Barnes, Kisselle, Laughlin & Raisch
ATTORNEYS

June 3, 1952 E. E. WEMP 2,599,215
AUTOMATIC TRANSMISSION
Filed Oct. 18, 1950 17 Sheets-Sheet 7

INVENTOR.
Ernest E. Wemp
BY
Barnes, Kisselle, Laughlin &
Raisch
ATTORNEYS

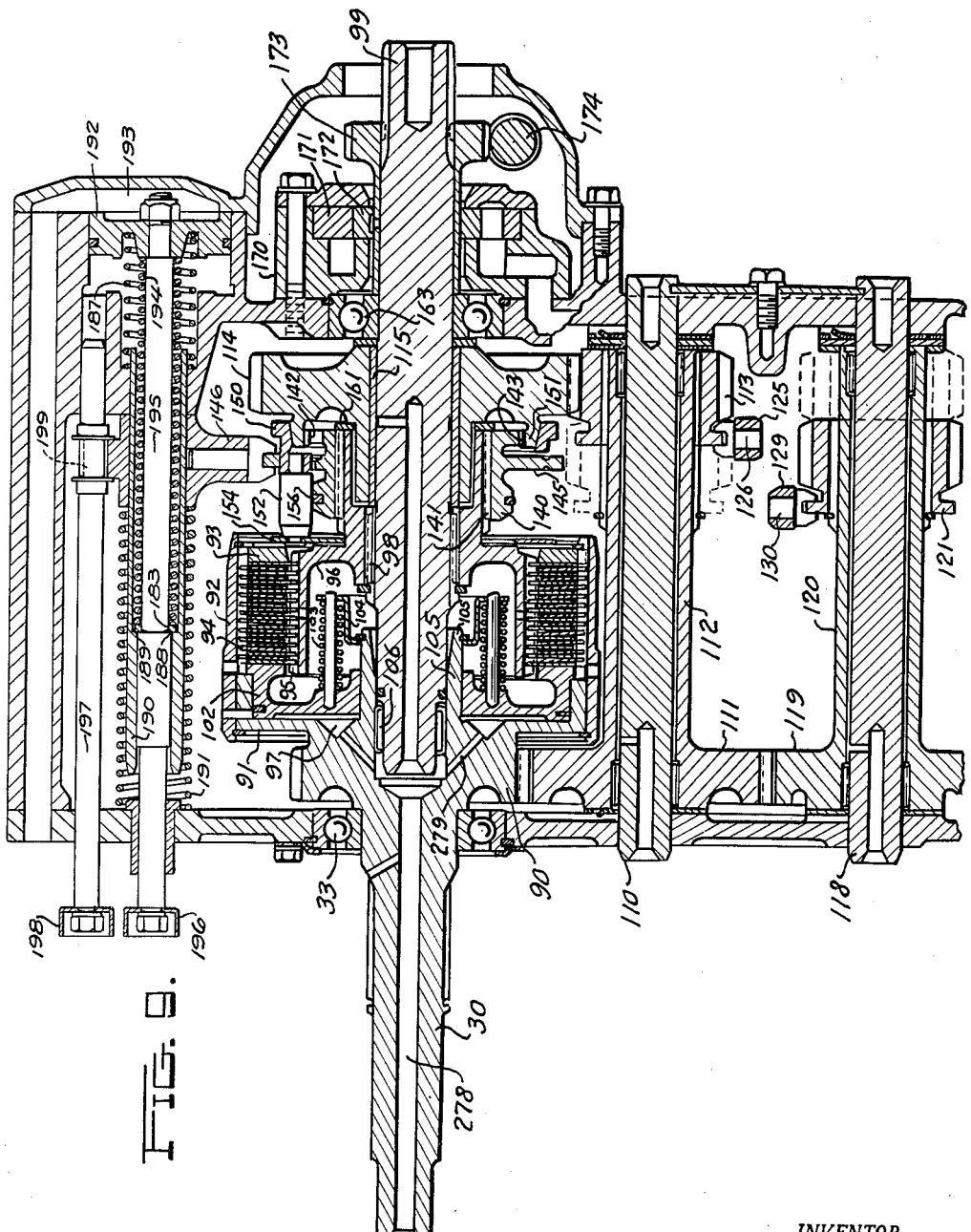

INVENTOR.
Ernest E. Wemp
BY
Barnes, Kisselle, Laughlin & Raisch
ATTORNEYS

June 3, 1952     E. E. WEMP     2,599,215
AUTOMATIC TRANSMISSION
Filed Oct. 18, 1950     17 Sheets—Sheet 10
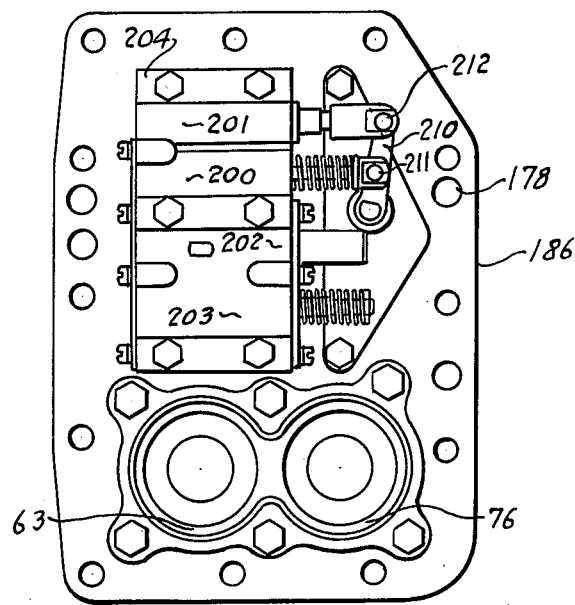
FIG. 14.
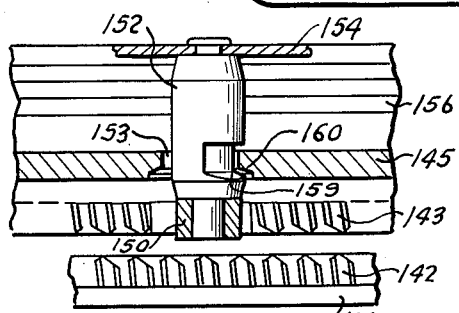
FIG. 13.
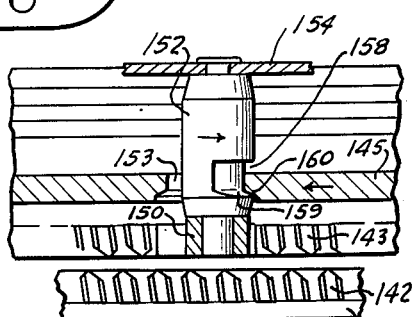
FIG. 13.ᵃ
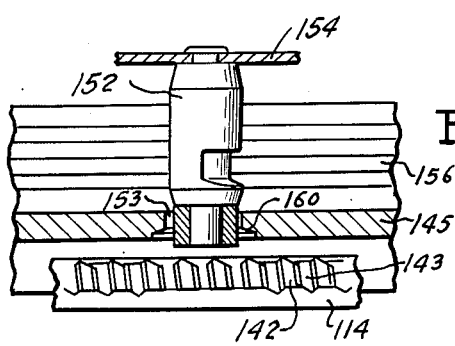
FIG. 13.ᵇ
INVENTOR.
Ernest E. Wemp
BY
Barney, Kisselle, Laughlin & Raisch
ATTORNEYS

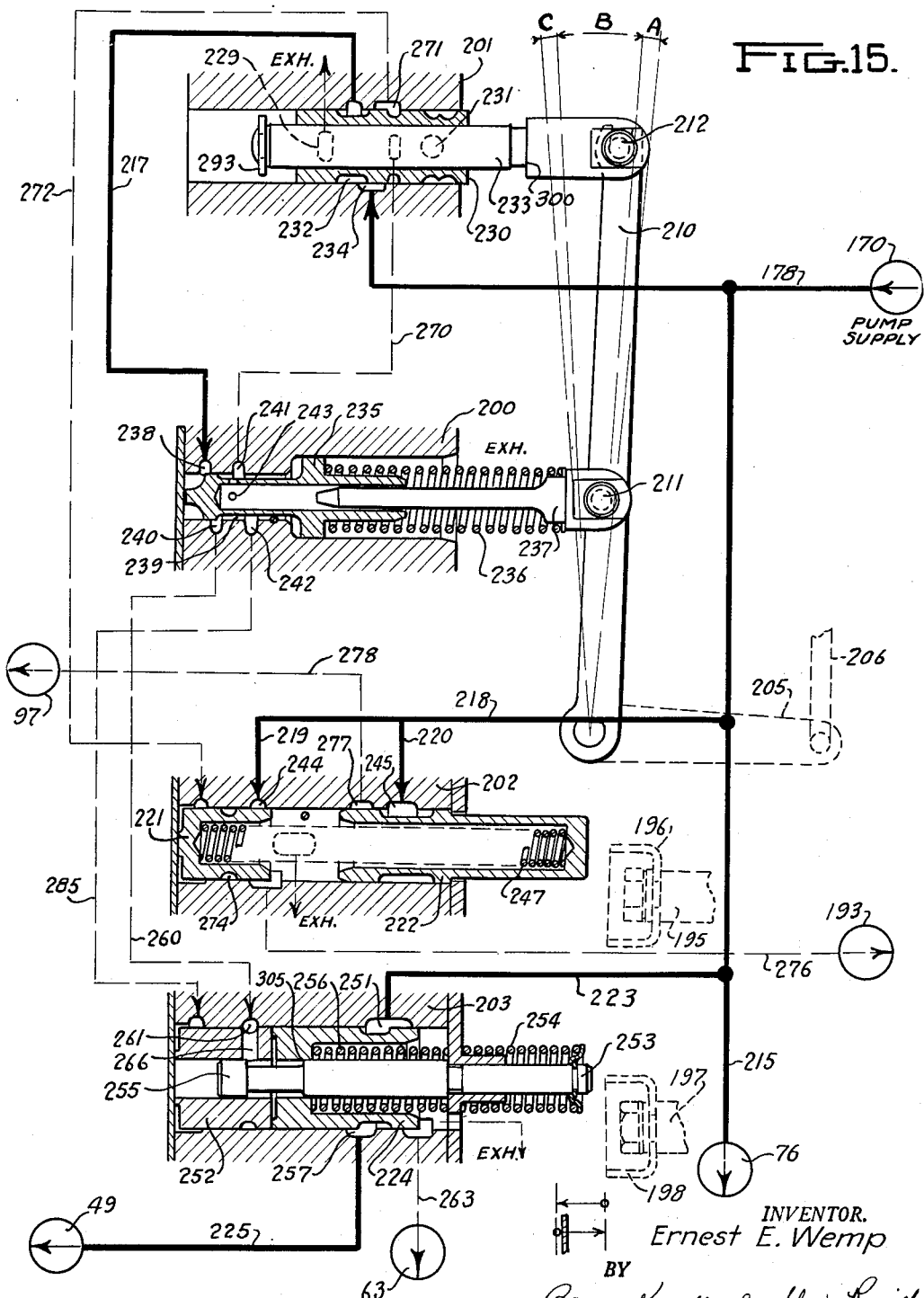

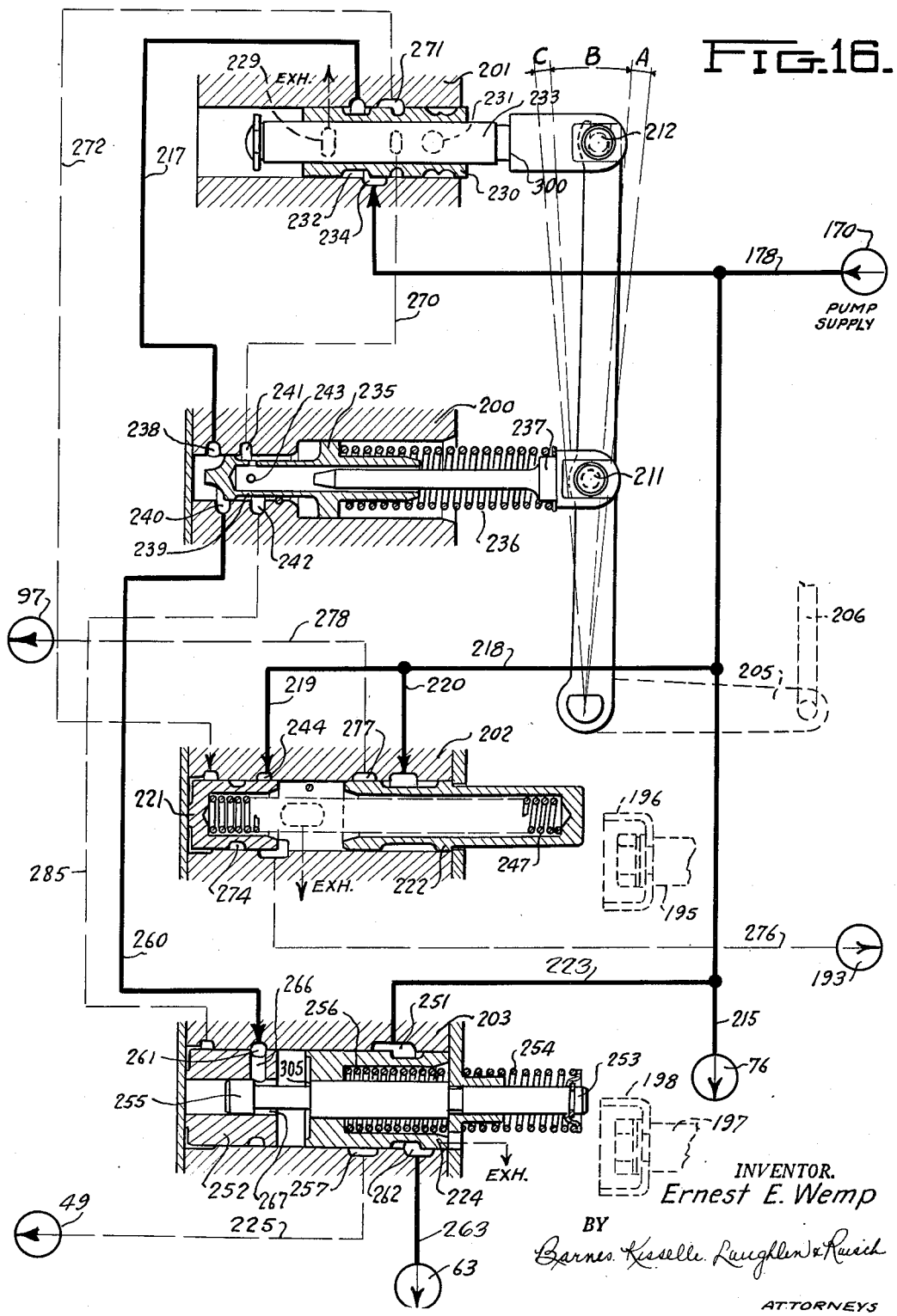

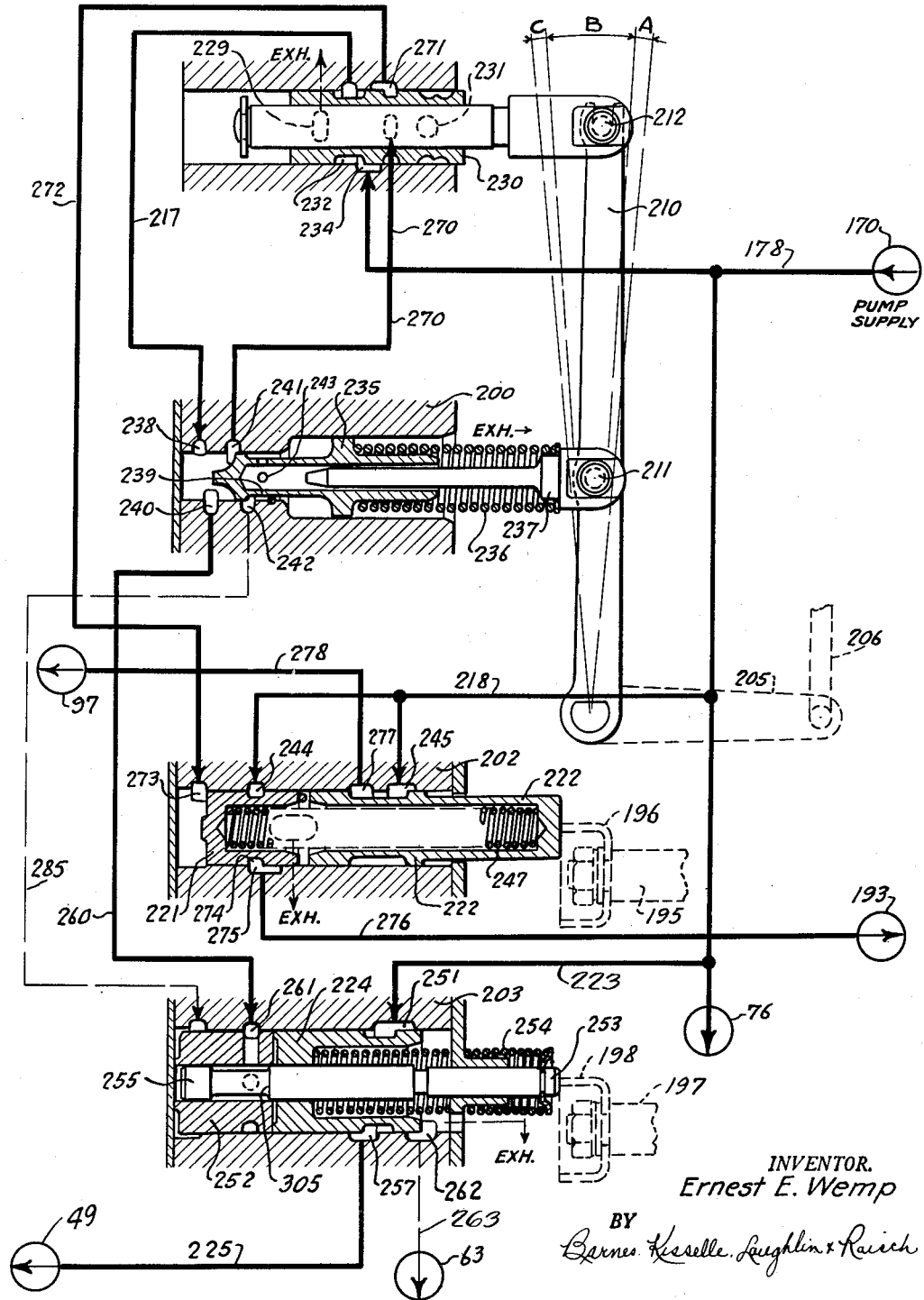

June 3, 1952     E. E. WEMP     2,599,215
AUTOMATIC TRANSMISSION
Filed Oct. 18, 1950     17 Sheets-Sheet 14

INVENTOR.
Ernest E. Wemp

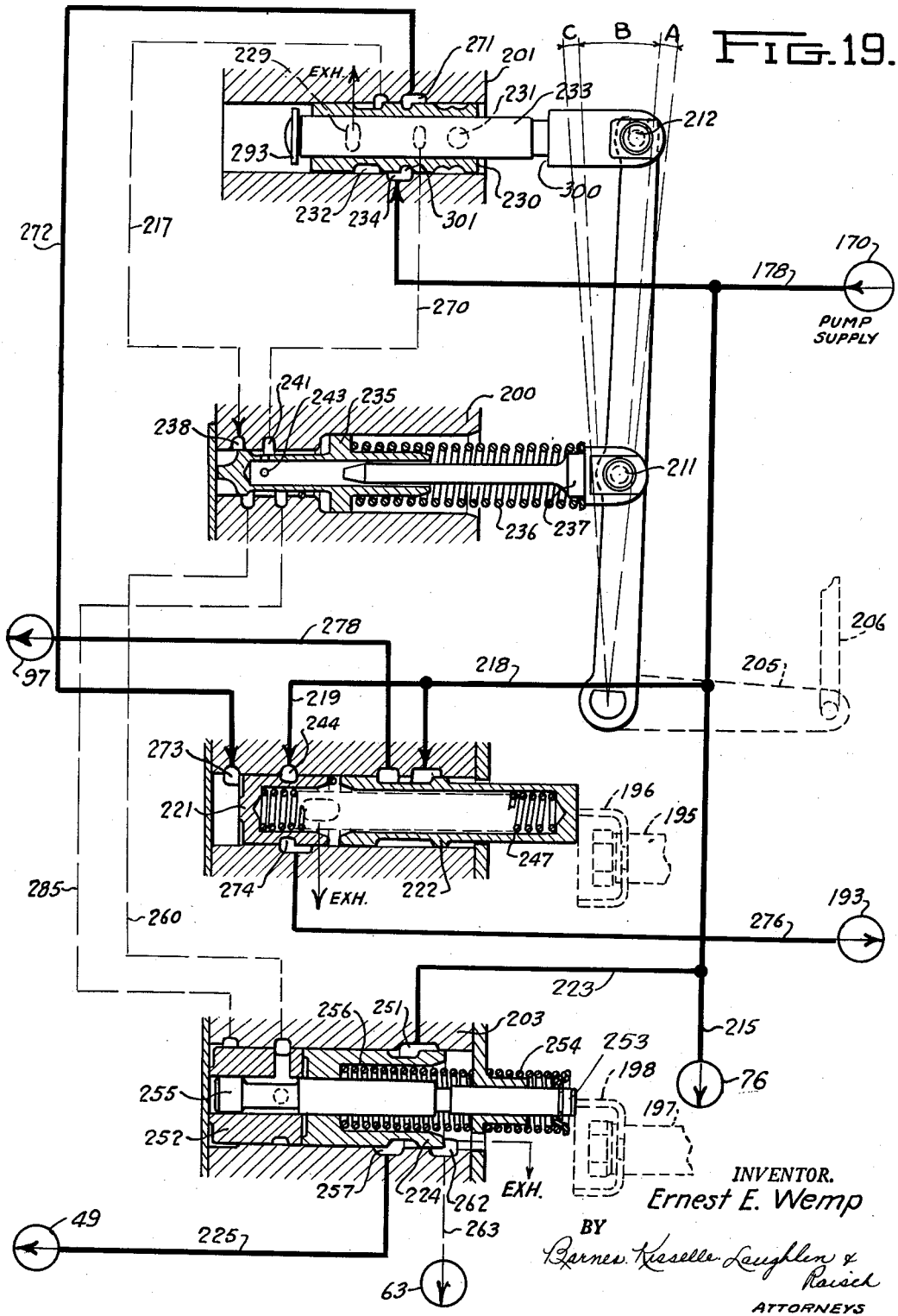

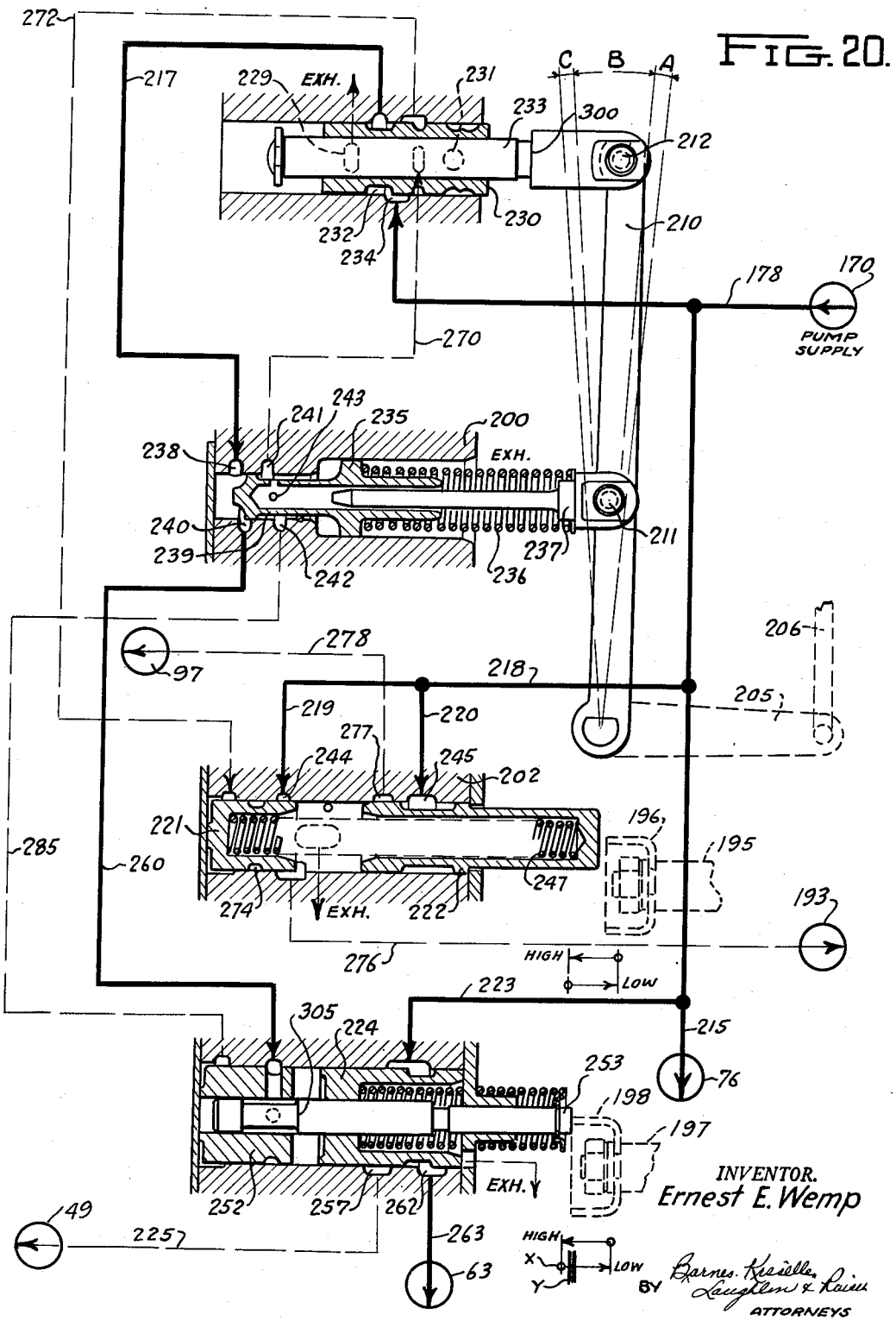

June 3, 1952   E. E. WEMP   2,599,215
AUTOMATIC TRANSMISSION
Filed Oct. 18, 1950   17 Sheets-Sheet 17

INVENTOR.
Ernest E. Wemp
BY
Barnes, Kisselle, Laughlin & Raisch
ATTORNEYS

Patented June 3, 1952

2,599,215

UNITED STATES PATENT OFFICE 2,599,215

AUTOMATIC TRANSMISSION

Ernest E. Wemp, Detroit, Mich., assignor, by direct and mesne assignments, of sixty-five per cent to himself, five per cent to Clyde J. Smith, five per cent to Leah Kathleen Smith, twenty per cent to Lila A. Wemp, all of Detroit, Mich., and five per cent to Eleanor May Wemp, Los Angeles, Calif.

Application October 18, 1950, Serial No. 190,807

15 Claims. (Cl. 74—645)

This invention relates to an automatic transmission especially for use with an automotive vehicle having an internal combustion engine. This application is a continuation in part of application Serial No. 773,248, filed September 10, 1947, now abandoned.

The principal objects of the invention are to provide an improved transmission construction and control therefor by means of which several speed ratios are obtained in an automatic manner through which the torque of the engine is transmitted to the final output member which is coupled to the wheels of the vehicle. To this end, a transmission construction is provided which, in itself, provides a positive driving action in the low speed ratio, which is the one usually employed when the vehicle is started from a standing position, and the transmission is arranged to be employed in combination with a coupling to the engine of an automatic nature. The coupling is one which will permit the engine to operate at an idling speed, while the vehicle stands at rest but which, upon acceleration of the engine, transmits torque to the transmission.

One form of such coupling is a fluid coupling commonly known as the fluid flywheel. The invention is disclosed in conjunction with a fluid flywheel. Such a coupling, while having a slipping action when the engine is idling and the vehicle is at rest, nevertheless transmits some torque which tends to cause the vehicle to creep. It is an object of the invention to provide a transmission which, while otherwise normally conditioned to transmit torque to the traction wheels upon acceleration of the engine, eliminates the creeping action by means which overcomes the relatively small amount of torque which causes the creeping action.

More particularly, the invention provides an automatic transmission comprised of two sections so related as to be capable of providing four speed ratios. One section preferably embodies a planetary gear set with automatic control means whereby the planetary gear set may be locked up to function as a unit or conditioned to transmit torque through the operating gears. Another section, which may be for convenience, termed the range selector section, is in the nature of a gear box so arranged that torque may be transmitted through the gears and so that driving and driven parts may be coupled together in dental engagement for transmitting torque directly therethrough. With the two sections properly related, four speeds are obtainable and hydraulic means are provided under the dual control of speed and torque for selectively conditioning the transmission for effecting the proper speed ratio. The transmission also is so constructed as to provide for transmitting the torque in reverse and so that the vehicle may be pushed or towed to start the engine.

A construction in accordance with the invention is disclosed in the accompanying drawings:

Fig. 3 is a general view, largely in cross section, of a transmission constructed in accordance with the invention, illustrating the same together with a fluid coupling situated between the engine and the transmission.

Fig. 3a is an enlarged cross sectional view of the forward part of the transmission.

Fig. 6 is a slightly enlarged view taken substantially on line 6—6 of Fig. 3 illustrating elements in the rear or range selector section of the transmission.

Fig. 9 is an enlarged developed view in cross section showing the range selector section of the transmission.

Fig. 12 is an enlarged sectional view taken substantially on line 12—12 of Fig. 3 showing some of the blocking elements in the range selector section.

Fig. 13 is a developed sectional view illustrating the disengaged position of dentally engaging teeth and showing elements of the blocker structure.

Fig. 13a is a view similar to Fig. 13 showing the blocker elements in blocked position.

Fig. 13b is a view similar to Figs. 13 and 13a showing the teeth in dental engagement.

Fig. 14 is an inside face view of a cover plate for the housing which incorporates hydraulic controlling means.

Fig. 15 is a view illustrating diagrammatically the hydraulic system and showing the structure of controlling valve mechanism, the view illustrating the condition of the hydraulic system in first or low speed; the hydraulic medium being introduced into those parts and conduits shown by the dark lines.

Fig. 16 is a view similar to Fig. 15 showing the condition of the hydraulic system in second speed.

Fig. 17 is a diagrammatic view similar to Fig. 15 showing the condition of the hydraulic system in third speed.

Fig. 19 is a diagrammatic view similar to Fig. 15 showing the condition of the hydraulic system in the overcontrol position.

Fig. 20 is a diagrammatic view similar to Fig. 15 illustrating the function of the system in a power shift from third speed to second speed.

Figure 1:
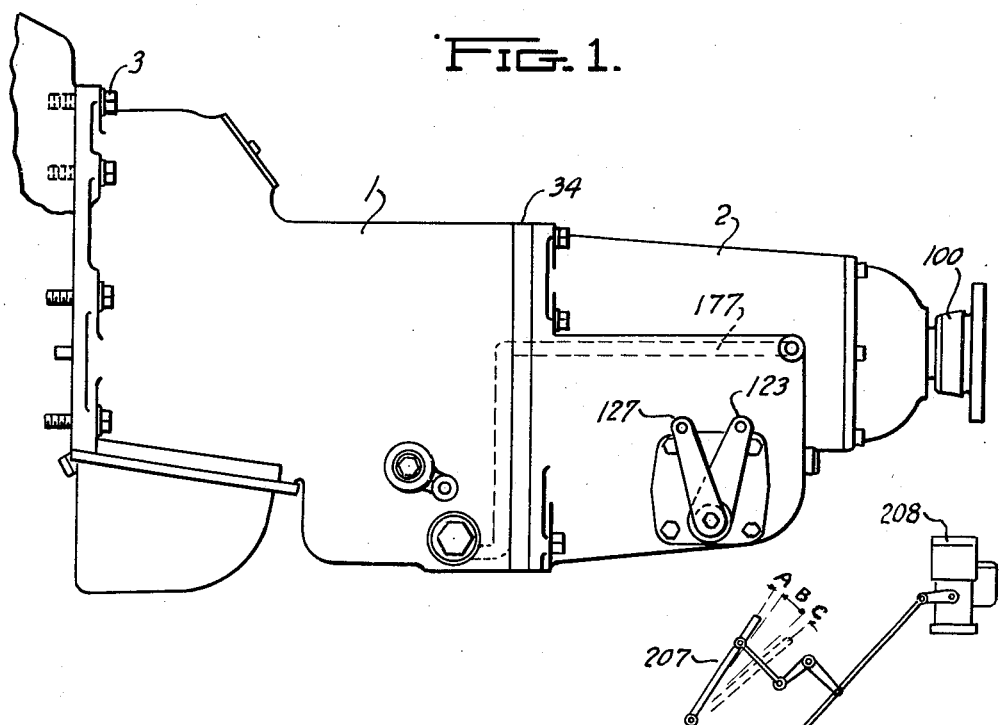
Fig. 1 is a side elevational view of the transmission housing.
Figure 2:
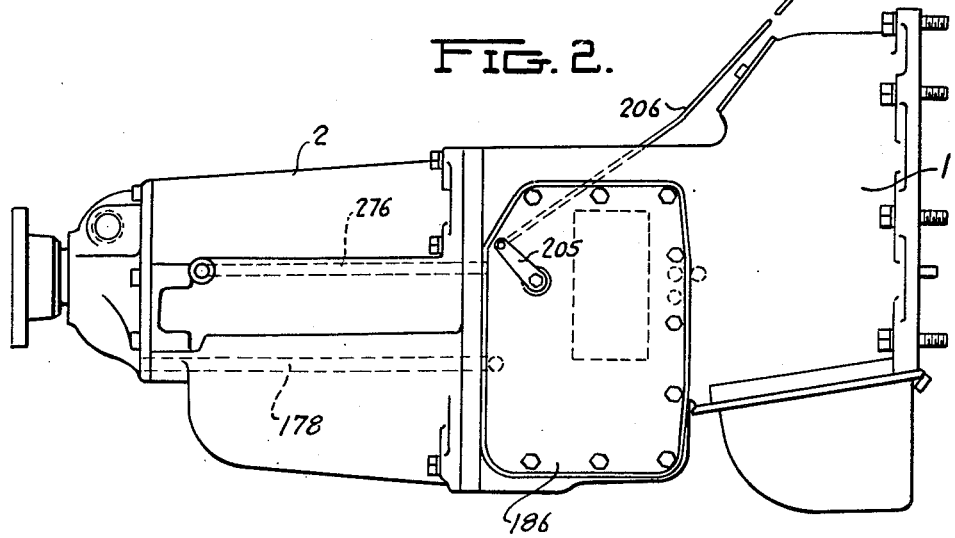
Fig. 2 is a side elevational view of the opposite side of the transmission housing illustrating the connection to a throttle control.

As illustrated in Figs. 1 and 2, the transmission includes a front housing 1 and a rear housing 2, the front housing being arranged to be connected to the block of an engine by means of cap screws 3. The flywheel of the engine is illustrated at 4 (Fig. 3) and it carries the impeller 5 of a fluid coupling, commonly termed a fluid flywheel, the runner of the coupling being illustrated at 6. The running is keyed or splined as at 7 to an element which may be termed a drive shaft 8, inasmuch as the element 8 is the power input member for the transmission. The impeller and runner are provided with a fluid seal as shown at 9.

Figure 5:
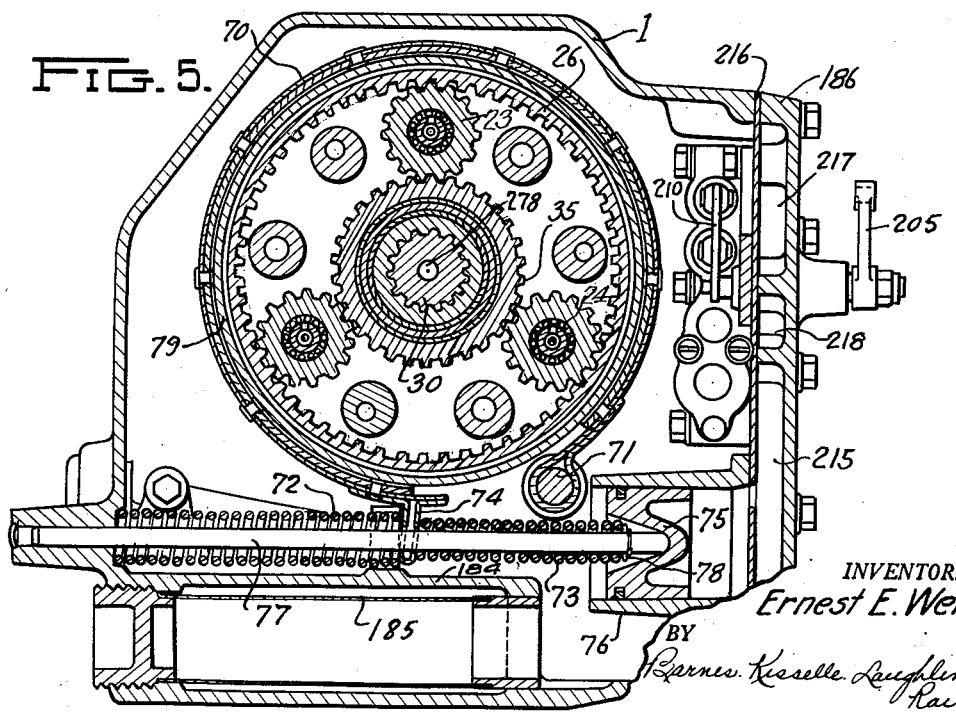
Fig. 5 is a view, slightly enlarged relative to Fig. 3, taken substantially on line 5—5 of Figs. 3 and 3a, illustrating elements of the planetary gear set and some of the controlling mechanism.

The drive shaft 8, which, for the most part, is in the form of a sleeve, is journalled in the housing 1 preferably through the means of an antifriction bearing 12, which, in turn, is situated in a bearing member 13 disposed in a hub-like portion 14 in the housing. The forward end of shaft 8 is piloted in a bearing 15 which also serves to pilot the hub of the runner. The drive element 8 has an enlarged sleeve portion 17 and has a further enlarged portion 18 and it terminates in a flange 19. Cooperating with flange 19 is an element having a flange 20 and a hub portion 21. Flange 19 and the cooperating element 20 constitute the carrier for the pinions of a planetary gear set. One pinion 23 is shown in Fig. 3, journalled upon a hollow pin 24, the ends of which are carried respectively by the flange 19 and the flange 20. Advantageously three of such pinions 23 are provided, as shown in Fig. 5, each preferably journalled on its pin by anti-friction roller bearing 24.

An internal ring gear 26 has its teeth meshing with those of the pinions 23. This ring gear 26 is non-rotatably mounted upon a flange element 27 which has a hub portion 28 keyed as at 29 to a shaft 30. The shaft 30 telescopes within the section 17 of the drive element 8 and may be piloted by a bearing 32 and it is journalled as at 33 in a partition plate 34 located between the two housings of the transmission.

The sun gear of the planetary gear set is shown at 35 and it has an extending part 36 which is keyed to the hub portion 38 of a member 40.

Situated between the member 40 and the hub portion 21 of the carrier 20 is a friction clutch. To this end, the member 40 has an extending part 41 and an end plate 42 so as to carry bolts 44, upon which a series of clutch discs 45 are mounted (Fig. 4), while alternate clutch discs 46 are mounted on the hub portion 21. The extension 41 has extending fingers 43 interlocked with the end plate 42 as shown in Fig. 10.

The member 40 is constructed so as to constitute a cylinder formation in which is disposed a piston 48 which acts upon the pack of clutch discs 45, 46, when, as will later be seen, liquid under pressure is introduced into the cylindrical chamber 49. As will be seen by reference to Fig. 4, coil springs 50 are alternately positioned relative to the bolts 44. These coil springs act upon the piston 48 and upon the end plate 42 so as to normally retract the piston in order to free the clutch plates 45, 46 relative to each other.

There is an overrunning clutch arrangement between the sun gear and the planet carrier. Specifically, this lies between the extension 36 of the sun gear and a portion of the hub 21. The rollers of the overrunning clutch are illustrated at 53 (Fig. 3 and Fig. 10). A roller retainer 55 is acted upon by a coil spring 56 so that they are held, or urged in a clockwise direction as Fig. 10 is viewed. The rollers function upon an inner circular surface 58 of the carrier member 21 and upon flat surface portions 57 of the sun gear.

Figure 10:
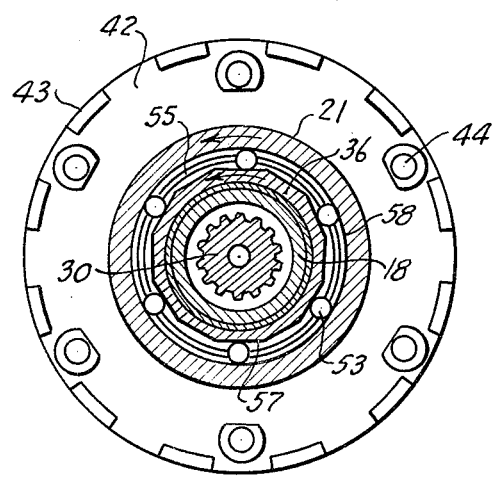
Fig. 10 is a sectional view, slightly enlarged relative to Fig. 3, taken substantially on line 10—10 of Fig. 3a, illustrating an overrunning clutch arrangement in the planetary gear set of the transmission.

Considering Fig. 10 for the moment, the normal direction of rotation of the elements is counter-clockwise as indicated by the arrows. It will be at once appreciated that the carrier member 21 may overrun, that is, run faster than, the sun gear and its portion 36, but that the moment the carrier member 21 tends to rotate slower than the gear, that is, by relative rotation which would be clockwise relative to the sun gear, the rollers 53 wedge in between the surfaces 57 and 58 and thus prevent the carrier from underrunning the sun gear. Similarly the rollers prevent the sun gear from overrunning the carrier.

Figure 4:
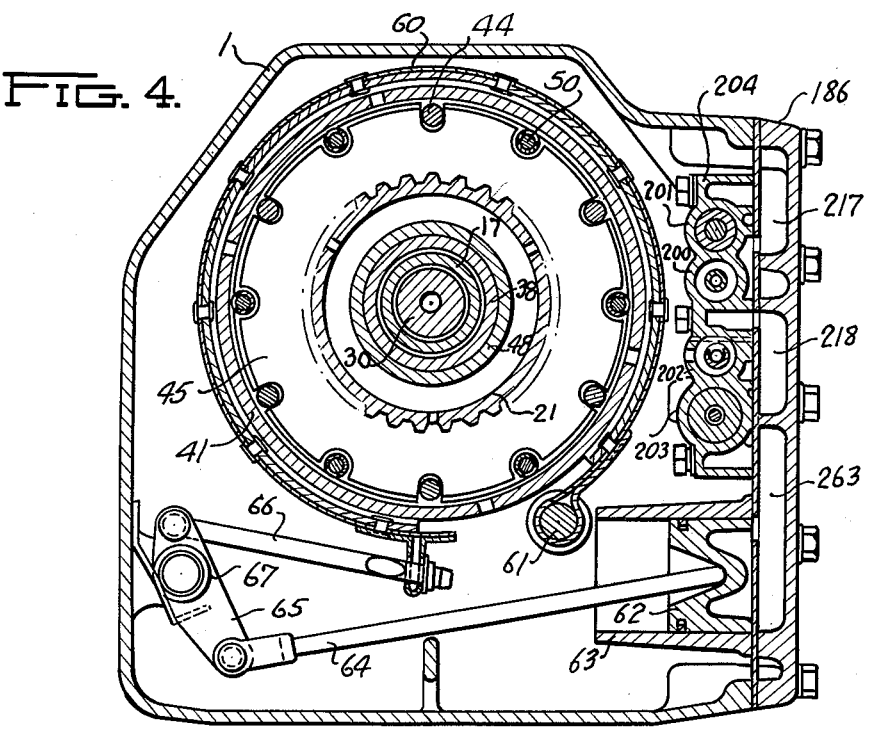
Fig. 4 is a sectional view, slightly enlarged relative to Fig. 3, taken substantially on line 4—4 of Figs. 3 and 3a, illustrating controlling elements for the planetary gear set.

A control for the planetary gear set is shown in Fig. 4. This resides in a brake band 60 anchored as at 61 and acted upon by a piston 62 in a cylinder 63, the piston functioning through a thrust rod 64, in turn acting through a rocker arm 65 and a thrust rod 66. A torsion spring 67 holds the brake band normally released and the piston in the head portion of the cylinder. The brake band is applicable to the portion 41. Thus, when the brake band is applied the sun gear is held stationary; the connection between the member 41 and the sun gear, tracing back through the members and parts 40, 38, 36 and to the sun gear 35.

There is also a control for the carrier as illustrated in Fig. 5, this being in the form of a brake band 70 anchored as at 71 and acted on by two opposing springs 72 and 73 which react oppositely on a finger portion 74 of the brake band. A piston 75 in a cylinder 76 acts upon a rod 77 which has a washer 78 which provides the reaction for springs 73. In the normal running position of the parts, hydraulic liquid under pressure enters the cylinder 76, pushes the piston to the position shown in Fig. 5 so that the brake band 70 is released. When the pressure of the liquid is inadequate as, for example, when the vehicle comes to a stop, and the engine is idling, the hydraulic pressure ceases or drops permitting the piston to back away against the action of the spring 72 and the brake band 70 is then applied to the flange 79 of an element which is connected to the carrier.

The purpose of this is as follows: If the engine is operating at an idling speed and there is no desire to transmit torque to the traction wheels of the vehicle, there is, nevertheless, a residual torque transmitted through the fluid coupling. In other words, the impeller 5 is rotating with the engine and while there is considerable slippage of the fluid coupling at such relatively low speed of rotation, torque is nevertheless placed on the runner 6 which, of course, is transmitted to the carrier. The brake band 70 grips the element 79 and thus holds the carrier from turning incident to this torque. As will be explained later, as soon as the engine is accelerated, liquid under pressure is pumped into the cylinder 76 to release the brake member. The brake 70 has substantially only a sufficient torque capacity to overcome the creeping action.

Before proceeding with the remaining description, it might be well to briefly consider the operation of the planetary gear set without, however, going into full detail of the automatic functions of the control of the transmission. It has just been pointed out how, with the engine idling, the torque transmitted by the fluid coupling is overcome by the brake band 70, but this is released in the normal operation of the construction. If the carrier and the sun gear are locked together as a unit, they revolve about the axis of the transmission but the pinions 23 do not rotate on their own axes and, therefore, the ring gear rotates in unison with the carrier and the sun gear. This drives the member 30 at a 1:1 ratio relative to the engine, except, of course, for the expected slippage in the fluid coupling. There is, in any event, a 1:1 ratio between the runner 6 and the member 30. If the sun gear is held against rotation and the carrier is released from its locked engagement with the sun gear, then, considering Fig. 5, the carrier revolves counterclockwise about the axis, the pinions rotate on their axes and the ring gear is driven at a speed of rotation faster than the carrier. Therefore, the member 30 is rotating faster than the engine, disregarding again any slippage in the fluid coupling. Thus, the planetary gear set is capable of providing two speed ratios as between the engine and the torque transmitting member 30.

The range selector section of the transmission in the rear housing 2 can probably be best appreciated by reference to the developed view of Fig. 9. This section is arranged to transmit torque directly at a 1:1 speed ratio and to transmit torque through gearing at a lower speed ratio.

The member 30 has a gear portion 90 and a flange 91 with an extending sleeve 92 provided with an end plate 93. A series of clutch discs 94 are slidably mounted internally in the extension 92. Alternate clutch plates 95 are slidably mounted on a hub element 96 which is connected by means of splines or the like 98 to an output shaft 99. The shaft 99 is arranged to receive a coupling element 100 for connection to a shaft extending to the traction wheels of the vehicle. The flange 91 and extension 92 constitute a cylinder 97 and in the cylinder is a piston 102 arranged to act upon the clutch plates to pack them together with the end plate 93 taking the reaction. The piston is normally held retracted by a number of springs 103 which react against a member 104 carried by a hub-like extension 105 of the member 30. The shaft 99 is piloted in the hub section 105 through roller bearings 106. It will be appreciated that if the piston is shifted to the right as Fig. 9 is viewed, the clutch plates 94, 95 are packed together and torque can be transmitted through the clutch plates, the hub element 96 and to the shaft 99 with a direct drive at 1:1 speed ratio between the shaft 30 and the shaft 99.

The gearing includes a counter-shaft 110, upon which is mounted a gear 111, the teeth of which mesh with those of gear 90 and the gear 111 has a sleeve 112 upon which is slidably mounted a gear 113 whose teeth may mesh with those of gear 114 which is journalled as at 115 on the shaft 99. As will be presently seen, the gear 114 may be coupled with the hub element 96 and thus the torque may be transmitted from member 30 through the gears described to the shaft 99 at a reduced speed ratio.

The range selector section also includes reverse gearing. This comprises a shaft 118 upon which is mounted a gear 119 whose teeth mesh with those of gear 111 and which has a sleeve 120 with a slidably mounted gear 121 thereon. The shafts 110 and 118 are on centers equidistant from the shaft 99 as will be seen by reference to Fig. 6, but the gear 119, being smaller than gear 111, has a clearance with respect to gear 90 and if torque is transmitted through gear 119 and 121, the gear 114 is rotated in a reverse direction with the teeth of gear 121 meshing with those of gear 114.

The gears 113 and 121 are arranged so that only one may be in engagement with gear 114 at a time. In Fig. 9 the gear 113 is positioned to drive gear 114 while the gear 121 is shifted out of position. When a reverse is to be made, the gear 113 is shifted to its dotted line position and the gear 121 is shifted to its dotted line position, in which position it drives the gear 114.

For selectively shifting the gears 113 and 121, there is a lever 123 mounted on a sleeve 124 which carries an arm 125 having a shoe 126 in engagement with a flange on the gear 113 (Fig. 9). Another arm or lever 127 is on a rod 128 having an arm 129 with a shoe 130 in engagement with the gear 121 (Fig. 9). The arms 125 and 129 are interlocked by means of oppositely disposed detents 133 and 134 carried by a bracket member 135 and pressed outwardly by a spring 136. The detents engage respectively in the recesses in the arms 125 and 129. Only when one of the gears 113 or 121 is disengaged from the gear 114 can the other of the gears 113 or 121 be shifted into engagement with gear 114. This is because, for example, the detent 133 must be seated in its cooperating recess and arm 129 in order to provide for adequate retraction of detent 134 for movement of the arm 125. Likewise, the detent 134 must be in its recess in arm 125 before arm 129 can be moved. When both the gears 113 and 121 are shifted out of engagement with the gear 114, the transmission is in neutral. The levers 123 and 127 will, of course, be suitably connected to control means convenient for the operator so that they may be shifted to effect reverse operation of the vehicle.

The coupling between the gear 114 and shaft 99 is a dental coupling and to this end there is a coupling member 140 slidably splined on the hub element 96 as at 141. The gear 114 has a set of internal teeth 142 and the coupler 140 has a set of external cooperating teeth 143 for dental engagement therewith. The coupling may be shifted slidably to bring the teeth into engagement and to disengage them. The coupler has a flange 145 engaged by a shifter element 146 by means of which the coupler may be shifted axially.

As pointed out above, torque may be transmitted through the clutch elements 94 and 95 and at this time the coupler 140 is running at a higher speed than the gear 114. Blocker means are provided for blocking movement of the coupler toward dental engaged position with the gear 114 and for releasing the blocking action substantially when the coupler and gear become synchronized so that the teeth 142 and 143 become dentally engaged substantially at synchronization. The blocker means shown herein is of the same type as that described in my application Serial No. 646,982, filed February 12, 1946, now abandoned, which has been replaced by application Serial No. 20,002, filed April 9, 1948.

Specifically, the blocker structure illustrated (Figs. 9 and 13) comprises a member 150 with an internally coned face for engaging the conical face of an extension 151 of gear 114. The member 150 is in the form of a ring mounted on extensions of three pins 152. These pins pass through apertures 153 in the flange 145 of the coupler. The opposite ends of the pins are mounted on a holding ring 154. The coupler is frictionally associated with the blocker by means of an expansion spring 156 as shown in Fig. 12. This spring is located in a groove in the coupler as shown in Fig. 9, and expands outwardly to frictionally engage the several pins 152. The ends of the springs may be fashioned inwardly as at 157 to engage one of the pins and hold the spring positioned circumferentially.

Each pin is of a diameter as to fit within an aperture 153 with a nice sliding clearance and each pin is formed with a recess 158 with a slightly inclined face 159. Face 159 is a blocking face and the flange about each aperture is formed with a cooperating blocking face 160.

When torque is transmitted through the friction clutch, and it is desired to dentally engage the coupler with the gear 114, the actuator 146 places a load to the right on the coupler, as Fig. 9 is viewed; the conical face of elements 150 and 151 engage each other and the slower running gear 114 rocks the blocker structure in a direction corresponding to the arrow of Fig. 13a thus bringing the face 159 in blocking position with respect to the face 160 of each aperture in the coupler flange. Movement of the coupler toward dental engaged position is thereby blocked. Eventually, however, in the operation of the mechanism the speed of rotation of the gear accelerates relative to the coupler and substantially upon synchronization, and specifically when the gear starts to overrun the coupler, the reaction between blocker 150 and cone 151 reverses in direction and the blocker pins are shifted in the opposite direction relative to the flange thereby allowing the coupler to continue its movement to the right as Fig. 9 is viewed, with the teeth 143 moving into dental engagement with the teeth 142 (Fig. 13). It will be appreciated that the expanding spring 156 frictionally engages the blocker pins so as to urge the cone faces together upon movement of the coupler. The spring 156, however, is loose in its groove so that the coupler and the blocker are quite free for relative rotational movement. Accordingly, when the parts are in the position shown in Fig. 13 and Fig. 13b, the position of the pins in their several apertures is a random one within the small limits permitted.

Figure 11:
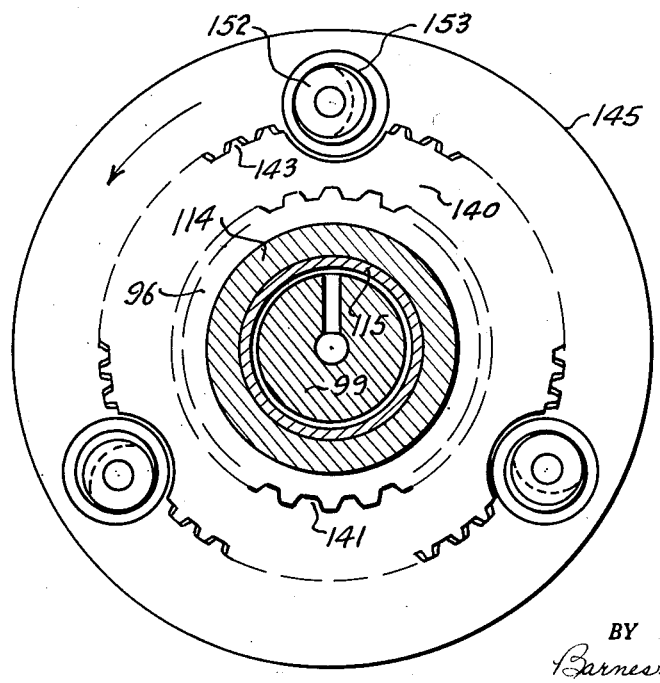
Fig. 11 is an enlarged view taken substantially on line 11—11 of Fig. 3 showing the face view of block structure for controlling the action of dentally engaging teeth in the range selector section and showing some parts in section.
Figure 8:
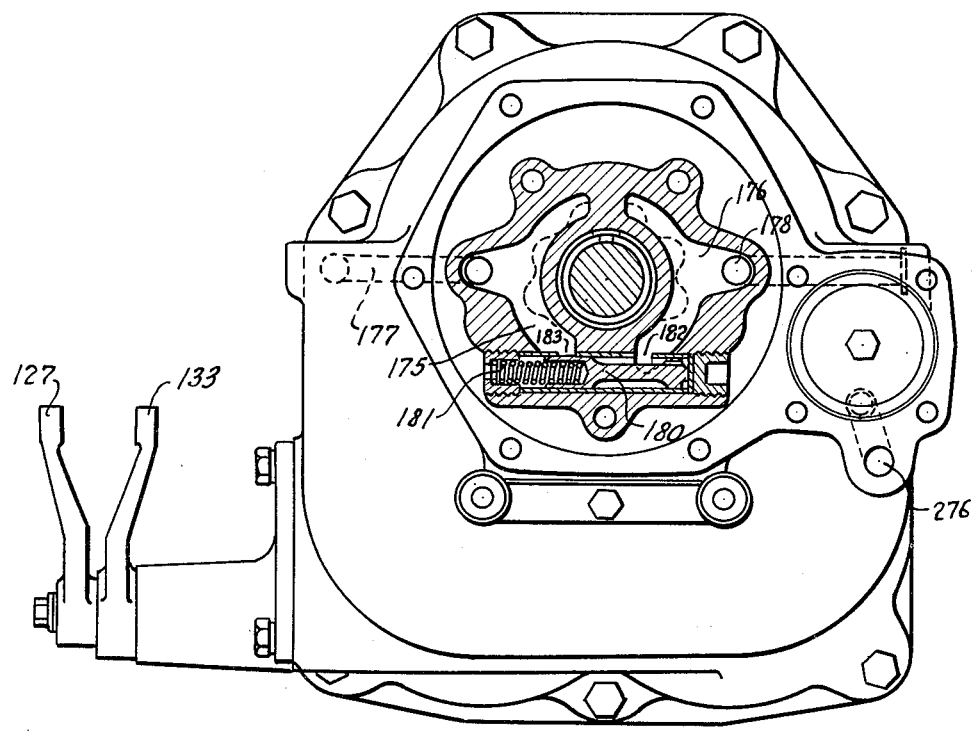
Fig. 8 is an enlarged view partly in section showing the pump structure for the hydraulic medium and showing some control mechanism.

It will be noted by reference to Fig. 13 that the dentally engaging teeth 142 and 143 are inclined on a left hand helix. Since the gear 114 drives the coupler, the action of the helix is to cause the teeth to tend to accept engagement in the normal direction of rotation which is counterclockwise as Fig. 11 is viewed. When the torque reverses as, for example, when the vehicle is coasting and the vehicle is driving the engine, the teeth tend to disengage but the angle is such that this normally does not occur as the coupler is held in engaged position by yielding means soon to be described. When the dental engagement is being made, as above described, there actually is no driving connection established until the coupler movement to the right, as Fig. 9 is viewed, is stopped, since the coupler is moving into the dental engagement a helical action and for this purpose there is a stop washer 161 for limiting coupler movement toward the gear 114.

Hydraulic means are provided as a control, and for supplying a hydraulic medium, such as oil under pressure, a pump is mounted for operation by the shaft 99. The pump employed is one of a type where the pressure of the medium pumped varies with the speed of pump operation. As the speed increases, the pressure increases. This function is employed as one of the governing factors in the automatic operation of the transmission. This pump is mounted to the rear of a bearing 163 for the shaft and it is generally shown at 170. It has rotary pump members 171 and 172, which are driven by a member 173 connected to the shaft 99. The member 173 may be a gear for the take-off of power by a member 174 which may drive a suitable speedometer or the like. The details of the pump need not be described but suffice to say, that both the members 171 and 172 are rotatable and they have interengaging teeth and recess formations in different numbers so that in the rotation thereof the medium is forced out of a recess upon the entrance of a projection. This type of pump is known to those versed in the art. Suffice it to say, that the pump has an inlet chamber 175 and an outlet chamber 176 with inlet and outlet lines 177 and 178. A pressure relief valve is illustrated at 180. When a determined pressure is attained, the valve member 180 is shifted against the action of the spring 181 and liquid in the outlet chamber 176 is by-passed through port 182 and port 183 back to the inlet chamber. It will be observed that a single pump is employed and this pump operates from the driven element 99 and, therefore, operates with movement of the vehicle and not necessarily with the operation of the engine.

Figure 7:
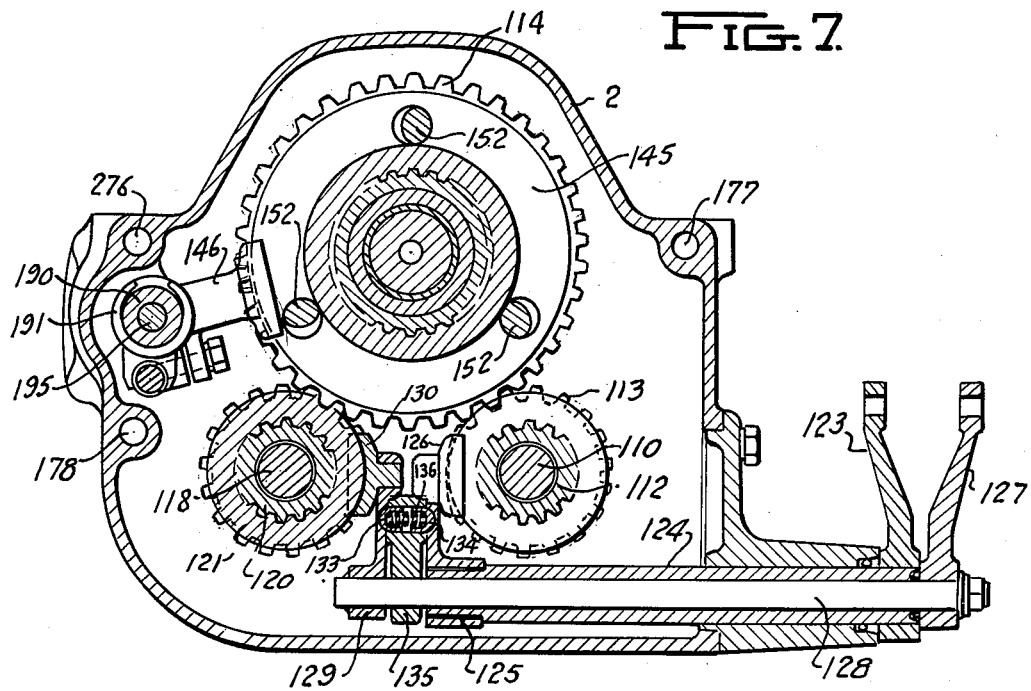
Fig. 7 is a slightly enlarged sectional view taken substantially on line 7—7 of Fig. 3 showing blocking mechanism and control mechanism in the range selector section of the transmission.

The inlet line 177 is advantageously a passage formed in the housing 2 (Figs. 6 and 7) and it extends through the partition plate 34 and then extends downwardly as shown at Fig. 1, and opens into the lower portion of the housing 1 and 2 which are interconnected and form a sump for oil. Specifically, there is a chamber 184 which opens into the housings 1 and 2 and is provided with a cylindrical screen 185, the inlet having its open end connected outside the screen. Thus all oil entering the inlet must flow through the screen. The outlet 178 (Fig. 2) is also preferably formed as a passage within the wall of the housing 2 and it extends to a control plate 186 which contains the major parts of the hydraulic control elements.

The operator for the coupler 140 which includes the actuator shoe 146, includes a sleeve 190 upon which the actuator 146 is mounted and in cylinder 193 has a piston rod 195 which exit is acted upon by a coil spring 191. A piston 192 tends through the sleeve 190. The piston is acted upon by a coil spring 187. A coil spring 194 surrounds a reduced portion of the piston rod 195 and lies within a portion of the sleeve 190 which is internally enlarged to accommodate the spring 194. The piston rod 195 has a shoulder 188 and the sleeve 190 has a shoulder 189. A washer 183 is slidable on the piston rod and is arranged to engage the two shoulders 188 and 189 and one end of the spring 194 abuts against the washer.

With this construction, it will be seen that, in the absence of hydraulic medium under pressure in the cylinder 193, the spring 191 holds the parts in the position shown in Fig. 9 with the coupler engaged with the gear 114. The spring 187 holds the piston 192 to the right as Fig. 9 is viewed. The forces of the spring 194 are locally resolved in the piston and its piston rod.

Figure 21:
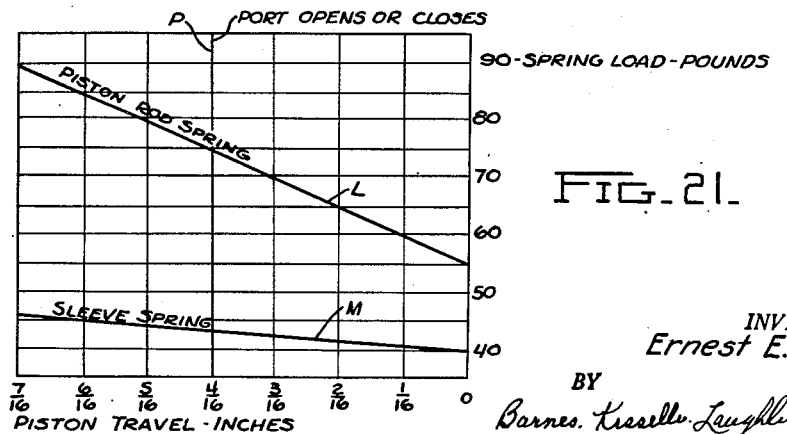
Fig. 21 is a diagrammatic view showing the relationship of the spring rates of the mechanism for actuating the coupler in the range selector section.

The two springs 191 and 194 have a rate relationship as indicated by the diagrammatic view (Fig. 21) where the spring rates are indicated as lineal functions. The piston rod spring 194 has a rate of increasing resistance indicated by the line L and it will be noted that this is a relatively steep rate line. The spring 194 is preloaded. Of course, the showing in Fig. 21 is exemplary only but in this example the spring 194 is preloaded to about 55 pounds, this being the condition the spring is in when the parts are in the Fig. 9 position. Should the piston and piston rod move to the left about 7/16" with the sleeve 190 remaining stationary, the spring 194 is further compressed to a load of about 89 pounds as shown by the upper end of the line L. The sleeve spring 191 has a lower rate as indicated by the rate line M. In the Fig. 9 position the spring 191 may be compressed so that it exerts a load of about 40 pounds. If the spring 191 be further compressed by movement of the actuator 146 about 7/16" to the left, as Fig. 9 is viewed, the spring load increases along the line M so that it exerts a load of about 46 pounds.

Figure 9A:
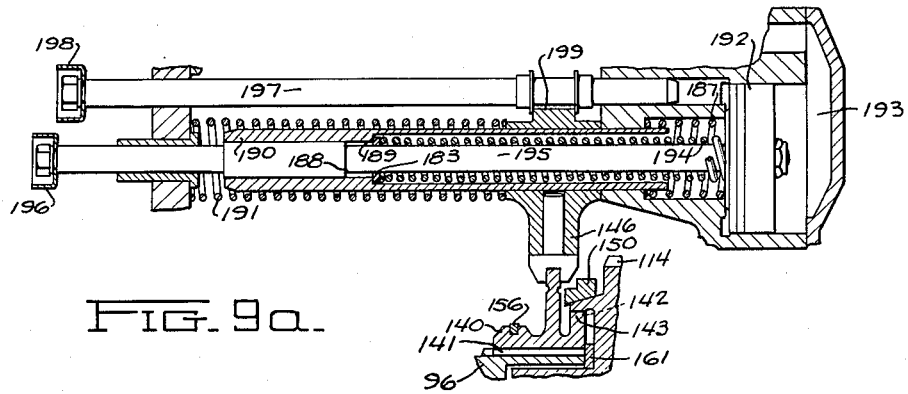
Fig. 9a is a cross sectional view of the coupler operating means illustrated in Fig. 9 showing the parts in position about to make a range shift.
Figure 9B:
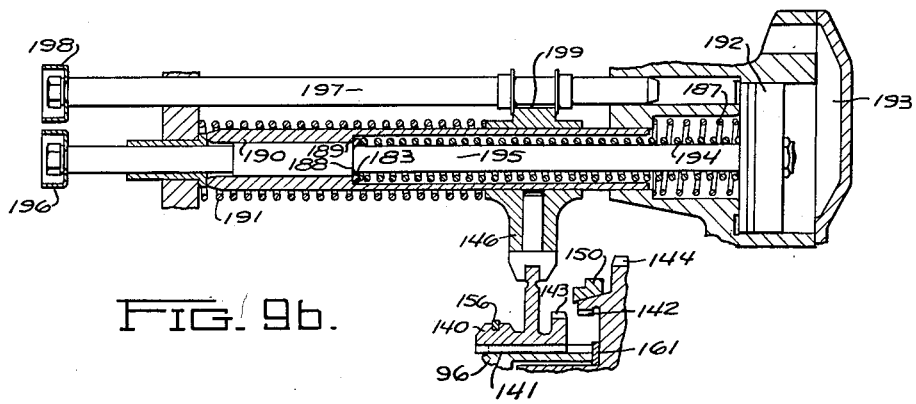
Fig. 9b is a sectional view similar to Fig. 9a showing the coupler operating mechanism and the coupler in shifted position.

When the parts are in the position as shown in Fig. 9, with the forces of the spring 194 locally overcome in the piston and its rod, the spring 191 holds the operator to the right with the pressure of about 40 pounds and the teeth 142 and 143 on the gear 114 and the coupler 140 are engaged. If hydraulic fluid under pressure is introduced into the cylinder the piston and its rod move to the left (Fig. 9a) and the spring 194 is compressed by this action so long as the sleeve 190 remains in position. This movement of the piston also compresses spring 187. In this situation (Fig. 9a) the spring 194 finds reaction in the shoulder 189 on the sleeve. When the piston and its rod complete the movement to the position shown in Fig. 9a the spring 194 is exerting about 89 pounds of pressure. Considering the chart in Fig. 21 it will be appreciated that there is a net pressure tending to shift the sleeve 190 to the left of about 49 pounds. When the sleeve shifts from the Fig. 9 position to the position shown in Fig. 9b, as will later appear in the description of the operation, the spring 191 is compressed so that it exerts about 46 pounds on the actuator. This permits the spring 194 to expand by movement of the sleeve but only to the extent of its preload so that it still acts on the sleeve and operator with a pressure of about 55 pounds. This leaves a net spring pressure to the left on the sleeve and actuator as Fig. 9b is viewed of about 9 pounds, which is adequate to hold the sleeve and actuator and coupler in the Fig. 9b position.

As will be seen by reference to Figs. 4 and 14, the plate 186 carries the cylinder 63 and the cylinder 76 and it also carries a block 204, which has portions which are cored out to provide all of the controlling valve structures. The cored out portions provide the valve bodies. As shown in Figs. 4 and 14, there is a cored out portion forming a master valve 200, a cored out portion forming an overcontrol valve 201, a cored out portion 202 for the power coupler relay valve, and a range valve, and a cored out portion 203 for other relay valves and a second range valve. The control plate 186 carries a lever 205 (Fig. 2) connected by a rod 206 to a throttle control 207 which may be a treadle and which controls, through the linkage shown, a fuel supply device, such as a carburetor 208. The accelerator treadle is arranged so that from its rest position shown in full lines in Fig. 2, it has a lash movement A, which is a lost motion movement, having no affect upon the carburetor, an operating range of movement B in which it controls the carburetor, and an overcontrol range movement C at the bottom of its stroke. On the inside of the plate 186, is an arm 210 mounted on the same axis as the arm 205 and it is connected at 211 with the master valve and at 212 with the overcontrol valve.

Referring now to Fig. 15, which diagrammatically illustrates the hydraulic system and also illustrates detail features of the various controlling valves, it will be noted that the pressure line 178 is in direct connection, through passage 215 to the no-creep cylinder 76. Such passage 215 and other passages are formed, as shown in Figs. 4 and 5, by a cored formation of the plate 186 and by the use of an intermediate plate 216. It will be seen, therefore, that the brake band 70 is normally applied by the spring 72, but as soon as there is hydraulic pressure admitted to the cylinder 76 the brake band 70 is released from the flange 79 connected to the carrier of the planetary gear set. The line 178 extends to and through the overcontrol valve 201 and then through a line 217 to a master valve 200. The line 215 is connected through line 218 and branches 219 and 220 to the power coupler relay valve 221 and to a No. 1 range valve 222. Line 215 also extends, through line 223 through the planetary unit relay valve 224 and then through line 225 to the planetary clutch control cylinder 49. Specifically, line 225 is comprised of a circumferential groove and ports 226, in the bearing member 13 which connect through passage 227 and the space between the sleeve 17 and the member 40 with a passage 228. The overcontrol valve 201 includes a sleeve 230 held in either one of two positions by a detent 231, and the body of the valve 201 and the sleeve have aligned ports 232 and 234 in the Fig. 15 position as shown, for the passage of the oil therethrough. The over-control valve 201 also includes a rod 233 slidable in the sleeve and which is connected to the lever 210.

The master valve 200 has a valve member 235 acted upon yieldably by a spring 236 positioned between the valve member and a reaction member 237 which is the piece connected at 211 to the lever 210. The valve member 235 is acted upon, in opposition to the spring, by the pressure of the hydraulic medium entering the valve through port 238. The master valve 200 also has a port 240, a port 241 and a port 242 for second, third and fourth speed ratios as will presently be seen. The valve member 235 has a section of reduced diameter to provide a passage 239 and this reduced portion has a plurality of ports 243. This construction serves to exhaust pressure from any one or all of the ports 240, 241, and 242 and their respective lines depending upon the position of the valve member 235, the exhaust extending out through the hollow part of the valve member 235 around the piloted extension 237.

The line 219 enters the power coupler relay valve 221 through the port 244, which is closed as shown in Fig. 15, and line 220 enters the No. 1 range valve 222 at port 245. The power coupler relay valve member 221 receives a spring 247 which acts upon the No. 1 range valve member 222 and normally holds the valve members in the position shown in Fig. 15. The valve member 222 is so positioned as to be engaged by the head 196 on the rod 195. The planetary unit relay valve 224 has a port 251, and its body 203 has a port 257, which register in the Fig. 15 position. There is a fourth speed relay valve 252, and slidably disposed within the valve members 224 and 252 is a rod-like valve 253 acted upon by a spring 254 and having a valving head 255 and a valving shoulder 305. A spring 256 holds the planetary unit relay valve 224 in the position shown.

*Operation in first speed*

Let it be assumed that the engine is at rest and the vehicle is not moving. There is no oil pressure in the system as shown in Fig. 15. Accordingly, various elements are inoperative except for the brake band 70 which is applied to the flange 79 by the spring 72. If the engine be started, and is operating at idling speeds, the fluid coupling 5—6 slips but there still is no hydraulic pressure because the vehicle is not moving. Under these conditions, the brake band 70 remains applied to flange 79 to thus hold the planetary carrier stationary. This eliminates all creeping action in the vehicle as the tendency of the fluid coupling to rotate the carrier of the planetary gear set is prevented. The dental coupling between the coupler 140 and the gear 114 is in engagement. It will be understood, of course, that the brake band 70 only exerts a light torque on the carrier sufficient to prevent the creeping action. Accordingly, as the engine is accelerated and the torque on the carrier increases substantially as the square of the increase in engine speed, the carrier begins to rotate with slippage at the brake band 70. The direction of rotation of the carrier is counter-clockwise, as Fig. 5 is viewed. The pinions 23 (Fig. 5) tend to rotate the sun gear forwardly (counter-clockwise). This tendency of the sun gear is prevented because of the overrunning clutch rollers 53 (Fig. 10) and, therefore, the ring gear 26, the carrier and the sun gear operate in unison or in a locked up manner. The torque is transmitted from the ring gear through the gearing in the range selector section as above described. In other words, the member 30 is rotated, the torque is transmitted through gears 90, 111, 113, 114, through dentally engaged teeth to the coupler and thence to the shaft 99.

As soon as the vehicle begins to operate the pump is actuated and liquid under pressure is pumped into the lines shown in dark lines in Fig. 15. The liquid passing to the cylinder 76 releases the no-creep brake band 70. Liquid under pressure passes through the overcontrol valve 201 to the master valve 200; the liquid under pressure in lines 219 and 220 is blocked and liquid under pressure passes to the cylinder 49 and eventually engages the planetary unit disc clutch 45—46. Engagement of the disc clutch supplements the action of the overrunning clutch 53 in locking up the planetary system, so long as the input torque is from the engine, and maintains the locked up status of the planetary system upon reversal of torque where the input is from the ring gear 26, in which condition the roller clutch 53 would tend to overrun.

The transmission will stay in low speed in accordance with the dictates of the master valve 200. The master valve is under the dual control of liquid pressure and throttle position. The pressure of the liquid varies with speed of movement of the vehicle and the position of the throttle determines the torque. Therefore, the master valve 200 is under the dual control of speed and torque. The lever 210 moves with the throttle member and its position determines the amount of compression of spring 236.

*Shift to second speed*

When the combined functions on the master valve 200 are such that the pressure of the liquid shifts the master valve, it may shift to the position shown in Fig. 16, and this opens up port 240 and the oil under pressure passes through the master valve 200 through line 260 and into port 261 for operating the planetary unit control valve 224. The oil passes from port 261 into a groove and through passages 266 in the relay valve 252 and thence through passage 267 around the ensmalled portion of the valve 253 to act upon the head of the valve member 224. The oil under pressure shifts valve 224 against its spring 256 thus closing port 257 cutting off oil under pressure to the cylinder 49 of the planetary lock up clutch and, at the same time, opening port 262 so that oil flows through line 263 to the cylinder 63 for engaging the planetary unit brake 60. Prior to movement of the valve 224, the cylinder 63 exhausted through the port 262 as shown by the position of valve 224 in Fig. 15. When the oil pressure is cut off from the cylinder 49, the cylinder may bleed through a bleed port 264, Fig. 3A, it being understood that this port constantly bleeds but that the pump capacity is adequate to overcome the bleeding action. The rate of decrease in capacity of the planetary lock up clutch 45—46 when its supply is cut off may be regulated by the diameter of the fixed orifice 264. When the brake band 60 is applied the sun gear is brought to a zero speed, with the free wheeling clutch overrunning. Now, by considering Fig. 5, where the direction of rotation is counterclockwise, it will be seen that the ring gear is rotated at a rate of speed higher than that of the carrier. The torque, however, is still transmitted through the same gearing in the range selector section and the increase of the speed ratio in the planetary is such that the shaft 99 is operated in what may be termed second speed. The dual conditions of speed and torque govern the controlling mechanism and determine when a shift is made form second speed to a higher speed. Under a fairly heavy throttle with resultant considerable compression of the spring 236 the transmission will stay in second speed until there is sufficient increase in liquid pressure to shift the valve member 235 against the compressed spring 236. This will occur at a relatively high vehicle speed. If the vehicle be operated under a relatively light throttle, with light compression of the spring 236, the pressure required to shift the valve member 235 is not so great and, therefore, the master valve 200 will shift at a lower speed of the vehicle. Eventually, however, the speed of the vehicle will increase to provide sufficient pressure to shift the valve member 235 further to the right and it will reach a position as demonstrated in Fig. 17.

*Shift to third speed*

Briefly, third speed comprises transmitting the torque through the locked up planetary gear set and through the clutch in the range selector section. Therefore, the brake band 60 must be released, the planetary lock up clutch 45—46 engaged, the dental coupling teeth 142 and 143 disengaged and the clutch discs 94—95 engaged. The increased pressure acting upon the valve member 235 opens the third speed port 241 so that the oil passes through line 270 through port 271 in the over-control sleeve 230 and to line 272 where it enters the power coupler relay valve 202 through port 273. This shifts the valve member 221 so that the oil pressure at port 244 is connected through port 274 to port 275 and thence into the line 276 where the oil pressure passes into the cylinder 193 (Fig. 9).

Several operations take place in rapid succession. Initiating the operation is the movement of the piston 192 and its rod 195 thus loading spring 194. In the final increment of its movement, the head 196 engages and shifts the #1 range valve member 222 to the position shown in Fig. 17 and oil under pressure now passes from port 245 and port 277 into line 278 to the cylinder 97. As shown in Figs. 3 and 9 the passageway 278 includes the hollow portion of shaft 30 which communicates with the cylinder 97 through ports 279 and to the controlling valve mechanism 202 through ports 280 in the piloted end of the member 40 and the bearing 13. This starts an engagement of the clutch plates 94—95.

Eventually, as will later be seen, this clutch 94—95 becomes partially engaged and then the loaded spring 194 shifts the coupler 140 to the left as Fig. 9 is viewed, to disengage the dental teeth 142—143 by shifting the sleeve 190 which carries with it the rod 197 and the head 198. The head 198 engages valve member 253 and pushes it to the position shown in Fig. 17 thus cutting off oil under pressure entering port 261 and relieving this pressure from the head of valve 224. This action occurs because the shoulder 305 enters the hollow of valve member 252, (Fig. 15). Valve member 224 moves from the Fig. 16 position to the Fig. 17 position so that oil again flows from port 257 through line 225 to the cylinder 49 to start engagement of the planetary lock up clutch plates 45—46. At the same time, valve 224 cuts oil pressure off from line 263 and opens that line to exhaust so that the planetary brake bank 60 releases. Eventually, therefore, the torque will be transmitted through the locked up planetary gear set on a 1:1 ratio and through the range selector section at a 1:1 ratio, the torque passing through the clutch plates 94—95 to the member 96 and to the shaft 99. This provides a 1:1 speed ratio through the transmission and may be termed third speed ratio.

The described arrangement for releasing the dental engagement of the teeth 142 and 143 is substantially the same as that described in my said co-pending application Serial No. 646,982, filed February 12, 1946, now replaced by application Serial No. 20,002, filed April 9, 1948. Suffice it to say herein, that due to the left hand helix of the dentally engaging teeth, the tendency is for the teeth to accept engagement so long as the torque is transmitted from the gear to the coupler. The diagram in Fig. 21 shows the rate of the spring 194 by the line L while the rate of the spring 191 is shown by the line M. The rate of the spring is its measure of increase in the resistance offered thereby in increments of deflection. When the coupler teeth are engaged with the teeth of gear 114 they are held together with a pressure of about 40 pounds exerted by the spring 191. As the piston 192 moves to the left under hydraulic pressure, as aforesaid, spring 194 is compressed with its rate progressing along the line L of Fig. 21 and it reacts against the shoulder 189 of the sleeve 190. The sleeve and actuator 146 and coupler 140 are held in position (Fig. 9a) by the combined forces of the spring 191 and the frictional load due to torque load on the dental teeth 142 and 143, as well as the frictional resistance of the coupler on its splines. The result is that the piston and piston rod may shift all the way to the position shown in Fig. 9a. All the while it will be remembered that the rod 195 and the head 196 are moving, and that the head strikes the valve member 222 and opens the port 277 at a position approximately at the line P. Therefore, the friction clutch plates 94—95 begin to engage under hydraulic pressure. Accordingly, although the spring 194 tends to shift the coupler out of dental engagement, the teeth will not become disengaged because the torque transmitted from the gear to the coupler, due to the helix and the frictional resistance of the coupler to sliding maintains the teeth engaged. As the friction clutch plates 94—95 come progressively into engagement, torque at a 1:1 ratio is transmitted to the coupler. Therefore, the input torque is divided between that absorbed by the friction clutch plates 94—95 and that transmitted to the dentally engaging teeth 142—143. As the torque transmitted by the clutch gradually increases, the tooth pressure grows progressively less and when this pressure approaches zero or at least so decreases, that the frictional resistance of the coupler to sliding on the inclined teeth and coupler splines no longer overcomes the disengaging action of the spring 194, the coupler shifts to the left to the Fig. 9b position and the teeth 142 and 143 are disengaged. Upon such movement of the coupler, as pointed out above, the head 198 strikes valve member 253 and admits oil to the planetary clutch cylinder 49, cuts off the oil pressure from cylinder 63, and ultimately both disc clutches become fully engaged and the driving ratio of the transmission is 1:1.

There may be times when, under a light throttle, and therefore light compression on the spring 236 and under fairly high speed and therefore fairly high oil pressure, the valve member 235 may shift rapidly so that the operating function skips the position shown in Fig. 16, and the transmission directly changes from low speed to third speed as shown in Fig. 17.

Shift to fourth speed

Figure 18:
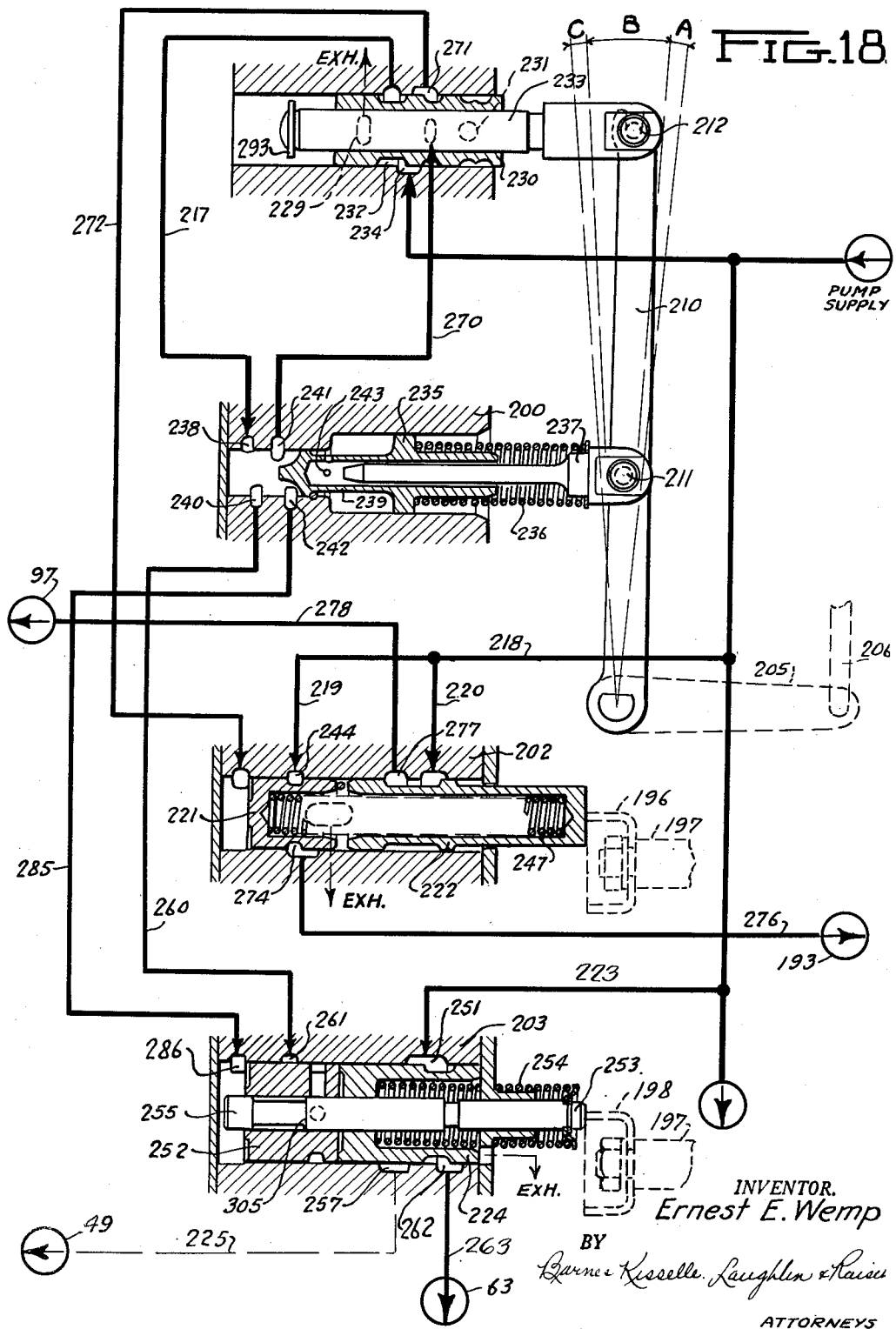
Fig. 18 is a diagrammatic view similar to Fig. 15 showing the condition of the hydraulic system in fourth speed.

A shift to fourth speed is effected by an increase in the liquid pressure which shifts the valve member 235 to the position shown in Fig. 18 so that the oil under pressure passes out through the fourth speed port 242 to line 285 and into port 286 of the fourth speed relay valve 252. This shifts valve 252 to the position shown in Fig. 18 thus causing it to engage and shift relay valve member 224 to the position shown in Fig. 18. This cuts off port 257 and opens port 262 so that oil is cut off from the cylinder 49 so that the planetary lock up clutch plates 45 and 46 become disengaged and oil passes to the cylinder 63 to engage the clutch band 60. This latter operation holds the sun gear stationary and the ring gear is operated at a speed of rotation faster than the speed of rotation of the shaft 8 or in an overdrive relationship. This may be considered fourth or high speed.

Over control operation

In all normal operation, the throttle is actuated in the range B, as shown in Fig. 2, with the lever 210 likewise operating in its range B. When it is desired to rapidly accelerate the vehicle where a lower speed ratio is beneficial, the accelerator may be pushed all the way down through the range C. When this occurs the shoulder 300 of the member 233 strikes the sleeve valve member 230 and shifts it to the position shown in Fig. 19. This closes the port 232 which connects to the line 217, and registers port 301 with port 271 which connects to line 272 which enters the power coupler relay valve 221 by port 273. Since pressure is relieved from the master valve 200, it is opened to exhaust through exhaust port 229 in the over-control valve 201 and shifts back to the position shown in Fig. 1, and the pressure through line 285 on the fourth speed valve 252 is relieved so that valve 252 moves to the Fig. 19 position. The lines 260, 270 and 285 are opened to exhaust through the ports 243. The valve member 224 also moves with valve 252 thus closing port 262 and cutting off liquid pressure to the brake band cylinder 63 and connecting port 257 for the transmission of liquid to the cylinder 49 for engaging the planetary lock up clutch discs 45—46. The action of the over-running clutch and the engagement of the clutch discs locks up the planetary unit for operation at a 1:1 ratio. The mechanism will thereafter operate at the third speed ratio throughout the entire B range of the accelerator and lever 210 until the accelerator is allowed to be retracted through the lost play range A. When this occurs, the head 293 on 233 engages the sleeve valve member 230 and shifts it back to the position shown in Fig. 15.

Shift from third to second

Figure 9C:
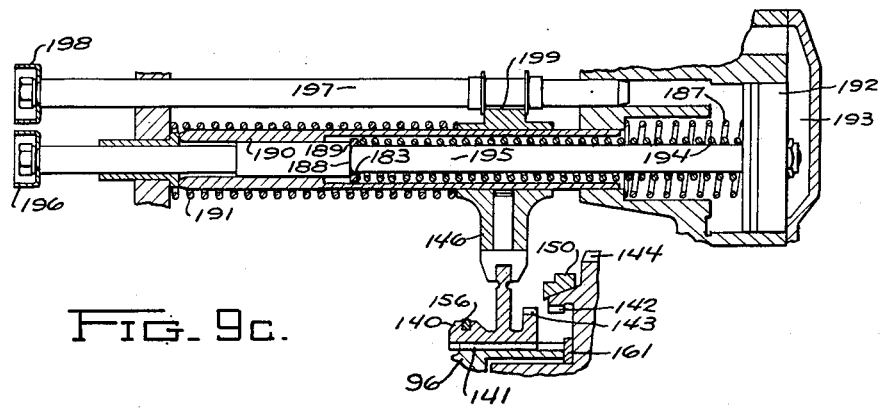
Fig. 9c is a view similar to Figs. 9a and 9b showing the coupler operating means in a position about to shift the coupler to the position shown in Fig. 9.

Since the master valve 200 is under the dual control of pressure and throttle position, or in other words, speed and torque, it will take various positions in opening and closing the ports 240, 241 and 242 in the operation of the vehicle so that the transmission will shift to a higher or lower speed ratio as is determined by these conditions. The diagram in Fig. 20 illustrates the power shift from the third speed ratio to the second speed ratio. This requires changing the planetary gearing from a locked up condition to an overdrive condition and changing the range section of the transmission from the clutch coupling to the dental engaged coupling. The shift of the master valve 200 to the position shown in Fig. 20 closes the third speed port 241, thereby closing the connection between ports 238 and 241 and, therefore, cuts the liquid pressure from line 270 and line 272. Relay valve member 221 shifts to the left as Fig. 20 is viewed, thus cutting the pressure from line 276 and the cylinder 193. The spring 187 pushes the piston back to the position as shown in Fig. 9c. When the piston and the head 196 are in a position substantially corresponding to line P (Fig. 21) the range valve member 222 has moved to a position where port 277 is closed thus cutting off pressure to the cylinder 97 so that clutch discs 94—95 may begin to disengage. The forces of the spring 187 are active only upon the piston and the hydraulic medium, and do not influence the cooperating relationship of springs 191 and 194. The position of the parts are now indicated in Fig. 9c where it will be seen that the spring 194 has moved away from the shoulder 189 of the sleeve 190. The spring 191 now tends to shift the control member 146 and the coupler to the right. Instanter, the blocker member 150 engages gear 114 which is running at a slower speed, and the movement is blocked as above described. The control sleeve 190 and the head 198 have moved from a position corresponding to the location X, to the location Y on Fig. 20. This movement is sufficient to remove the enlarged valve portion 305 of the valve 253 from the bore in valve 252 so that oil under pressure entering through line 260 pushes the relay valve member 224 to the position shown. This cuts off port 257, discontinues pressure of oil to the cylinder 49 and opens port 262 so that oil pressure enters cylinder 63. Therefore, the planetary lock up clutch plates 45—46 are disengaging and the planetary brake band 60 is engaging. Ultimately, the disengagement of the one and the engagement of the other is completed and the planetary gear set is operating in overdrive relationship with the sun gear held stationary. In the meantime, the speed of the gear 114 increases due to slippage between clutch plates 94—95 while the coupler 140 rotates at a substantially constant speed due to its connection to the output shaft 99 and when the gear begins to overrun the coupler, the reaction force on the blocker reverses and the blocking condition ceases and the spring 191 shifts the coupler 140 to the right with the teeth 143 entering into dental engagement with the teeth 142 (Fig. 9) substantially at the point of synchronization.

It will be appreciated that the hydraulic system, as above described, is, during all normal operation, full of liquid. For convenience in language, it has been stated many times above, that when a valve opened, liquid under pressure flows through. Perhaps, some small amount of liquid does flow but the system has remained full of oil so that there is a resultant immediate action with no necessity to pump the system full of oil when a valve opens. When the two cylinders 49 and 97 are cut off from the pump, they both bleed as above described, but in the normal operation, the capacity of the pump is sufficient to overcome the bleeding action. Furthermore, various other ports and oil passages are provided as shown for the issuance of oil from the system for lubricating purposes.

It will be noted that the transmission, in itself, that is to say, the planetary gear set and the range selector section provides no slippage when, for example, an initial start of the vehicle is made from a standing position. This is because the planetary set is locked up to transmit torque therethrough at a 1:1 ratio and because the transmission of torque through the range selector section is direct through the engaged teeth 142—143. The slippage occurs at the automatically acting coupling shown herein as a fluid flywheel.

When a vehicle is pushed or towed to start the engine, it is usually preferable to connect the traction wheels of the vehicle with the engine at a relatively high speed ratio. The preferred procedure, with a vehicle equipped with the transmission of the present invention, is to depress the accelerator treadle all the way down through its range C so as to shift the overcontrol valve sleeve 230 to the position shown in Fig. 19. This conditions the control for direct operation at a 1:1 ratio with the master valve 200 cut out of the system. This is the over-control position with the clutch discs 94—95 engaged and the clutch discs 44—45 engaged so that the shaft 8 and shaft 99 are directly coupled together.

As soon as the vehicle is moved at an adequate rate of speed, the pump operates to supply liquid under pressure and the liquid passes through the overcontrol valve 201 and through line 272 and enters the power coupler relay valve 221 at port 273. This shifts the power coupler relay valve member 221 as shown in Fig. 19 so that liquid under pressure passes from line 219 through the power coupler relay valve 221 into line 276 to the power coupler cylinder 193. Inasmuch as the torque is reversed, that is, being transmitted from the coupler to the gear, the dentally engaging teeth 142 and 143 tend to reject so that the dental engagement is disestablished. Also, pressure enters the cylinder 76 to thereby release the brake band 70 from the carrier of the planetary gear set.

In the movement of the piston 192, the head 196 of the piston rod 195 engages the range valve 222, shifts it to the position shown in Fig. 19, so that this valve is conditioned for transmitting the liquid under pressure from line 218 to line 278 and to the cylinder 97 to cause engagement of the clutch plates 94—95 for the transmission of the torque directly through the range selector section. The relay valve 224 is already in its normal position as shown in Fig. 19, so that the valve is conditioned for the transmitting of the pressure of the hydraulic medium from line 223 to line 225 to the cylinder 49 to thus engage the clutch plates 45—46 for locking up the planetary gear set so that it is conditioned for transmitting torque therethrough at a 1:1 ratio. The head 198 of rod 197 engages and shifts the range valve 253 but this performs no immediate function because the master valve 200 has been by-passed and no pressure exists in line 260 for acting upon the valve 224.

Now, it will be appreciated, that as the vehicle is pushed or towed, it is started at relatively low speed and therefore no substantial torque is transmitted through the fluid flywheel to the engine. In this case, the runner 6 is the driver and it slips with respect to the impeller 5. As the speed of the pushing or towing accelerates the relative slippage between runner 6 and impeller 5 decreases so that finally the engine is turned over with the transmission conditioned to transmit the torque from the shaft 99 to the runner 6 at a 1:1 speed ratio. The accelerator treadle may, as above described, be manipulated throughout its range of movement B, while the control remains in the over-drive conditions shown in Fig. 19. Thus, the engine may be manipulated throughout the entire throttle range and may be raced or operated at a high rate of speed to keep it going. Of course, as soon as the treadle 207 is allowed to move back through the range A, the overcontrol valve sleeve 230 is shifted back to the position shown in Fig. 15 and the system is again conditioned for automatic operation.

Figure 22:
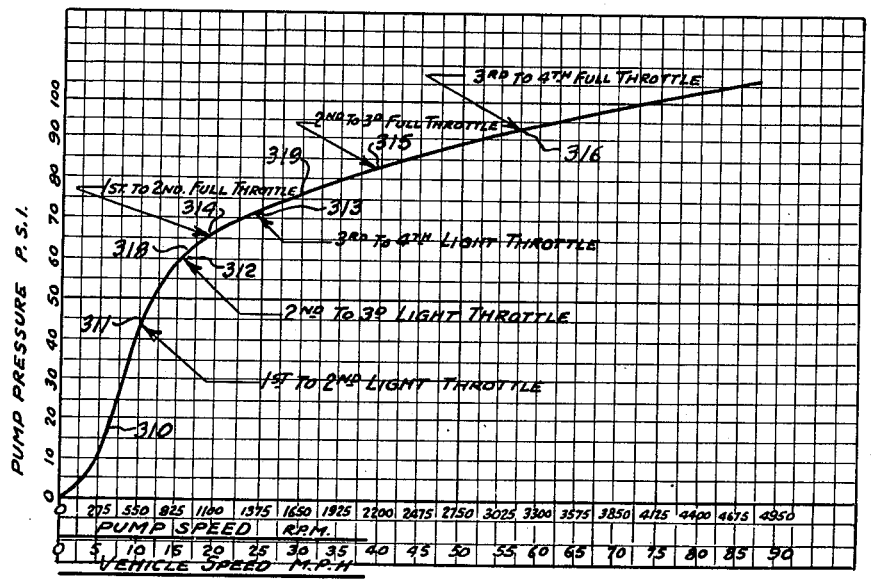
Fig. 22 is a diagram demonstrating pattern shifts of the transmission.

An appreciation of the operation of the transmission may be had by considering the pattern shifts demonstrated in Fig. 22. In this diagram the pump pressure curve in pounds per square inch is plotted against speed given both in pump R. P. M. and vehicle speed in miles per hour. Under an assumed and fixed light throttle, that is to say, assuming that the throttle is held in a fixed position, the pressure on the master valve 200 will shift the master valve from the low speed position to second speed position, thus causing a shift in second speed at about 11 miles per hour as shown at the point 311. Assuming that the position of the throttle 207 is maintained, the pressure increases and at about the point 312, which is about 16 or 17 miles per hour, a shift is made to third speed. In third speed, the acceleration continues, the pressure increases and then about the point 313, which is about 23 miles per hour, a shift is made to fourth speed.

Now, under a full throttle, that is, with the throttle 207 held widely opened, the spring 236 acting on the master valve 200 is considerably compressed. It, therefore, requires more pressure to shift the master valve 200 and the pressure becomes adequate for shifting the master valve at about the point 314 which is about 18 miles per hour. This shifts the transmission into second speed. With the throttle still maintained widely open, the acceleration continues and pressure continues to increase and at about the point 315 the pressure overcomes the spring 236, shifts the master valve 200, and a shift is made into third speed at about 39 miles per hour. Continuing with a full throttle, the pressure increases and at about the point 316, which is about 57 or 58 miles an hour, a shift is made into fourth speed.

The chart (Fig. 22) and the description thereof, give exemplary conditions only. An infinite number of conditions may occur between the full throttle and the lightest possible throttle condition.

A consideration of the chart will also be of help in considering a skip shift. Suppose, for example, an operator starts the vehicle from a standing position, under full throttle, and accelerates the vehicle up to a speed of about the point 318, which is about 17 miles per hour; the transmission has not changed its speed ratio. However, at this point, the operator relieves the throttle 207, thereby relieving the compression on spring 236. The pump pressure is adequate to quickly shift the master valve 200 beyond the second speed position and to the third speed position thus opening up third speed port 241 and a shift will be made from first speed to third speed thus skipping second speed. If the operator maintains a full throttle, to some speed between the points 313 and 314, and then relieves the throttle say, for example, at 30 miles an hour, demonstrated at point 319, the transmission will have shifted to second speed but on relief of the throttle the master valve 200 is shifted by the pressure of the liquid to the fourth speed position and thus third speed is skipped. These are only two examples of skip shifts which may occur.

Now, it will also be appreciated that where oil is used as the hydraulic medium, that its viscosity is greater when the oil is cold than when it is hot. This does not materially change the shape of the curve. It will be noted that the curve 310 rises rapidly up to about 65 p. s. i., and then begins to level off. With a cold oil the shape of the curve remains substantially the same but the entire curve may be visualized as being shifted to the left, as Fig. 22 is viewed. The only affect this has on the operation of the transmission is to cause the shifts from one speed to another speed to be made at a slightly lower vehicle speed.

General operation

The manner of the operation of the transmission in the making of power shifts from one speed to another can probably be better appreciated by a consideration of the same without resort to a detailed discussion of the movements of various controlling elements. The term power shift is used to describe the shifting from one speed to another while the transmission continues to transmit torque. An upshift or a shift from a lower to a higher speed of the output shaft is made in the range selector section when a predetermined percentage of the instant torque delivered by the member 30 is delivered through the friction clutch of the range selector section. Let $T$=input torque at the time of shift; $x$=torque absorbed by the friction clutch; $A$=the mechanical advantage through the gear train in the range selector section. It can be shown that $$x = \frac{A}{A+1} T$$

If, for example, the gear train provides a 2:1 advantage, then $$x = \frac{2}{2+1} T$$

Therefore, $x=\frac{2}{3}$ of the then input torque of the range selector section.

When a shift is being made in the range selector section, the clutch comprising plates 94—95 begins to engage and the engaging clutch gradually absorbs more and more of the input torque and finally when it has absorbed ⅔ of the torque (under the example given), leaving ⅓ transmitted through the gear 114, the tooth pressure at the dentally engaging coupler and gear is reduced to zero. Substantially at this point, the coupler moves out of dental engagement with the gear as previously described. The input torque may be light or may be great but the dental disengagement takes place when the clutch absorbs the predetermined percentage thereof. The friction clutch continues its engaging action, it being understood that the clutch is slipping and it gradually becomes fully engaged, thus gradually absorbing the remaining ⅓ of the torque until at full engagement the friction clutch transmits all of the input torque of the range selector section.

In the making of a downshift, which involves a release of the clutch and an engagement of the dental teeth, the action is one of frictional slippage. The friction clutch begins to disengage and it starts to slip. This permits the engine to accelerate relative to the shaft 99 and results in an acceleration of the gear 114. As described above, when the gear 114 is substantially synchronized with the shaft 99 and coupler, and the gear starts to overrun the coupler, there is a torque reaction reversal on the blocking agency and the coupler moves into dental engagement with the gear.

Some shifts from one speed ratio to another in the planetary set are made while the range selector section is in a fluid or slipping state. For example, when a shift is made from second speed to third speed, said shift involves disengagement of the dental teeth in the range selector section and engagement of the clutch therein, and it also involves changing the planetary gear set from its over-drive condition to its locked up condition. The movement of the piston 192 initiates the shift by the introduction of oil into the cylinder 97 to start the engagement of the clutch in the range selector section. As just described above, the dental teeth in the range selector section disengages when the clutch absorbs the predetermined percentage of input torque resulting in movement of the coupler and in the actuation of the relay valve 252 which results in the release of the brake band 60 and the starting of the engagement of the planetary lock up clutch plates 45—46. It will be seen, therefore, that this change in the condition of the planetary gear set is started upon the disengagement of the dental teeth in the range selector section and while the friction clutch in the range selector section is slipping or, in other words, while the range selector section is in a fluid state. When the brake band was still applied, the sun gear was held stationary and the carrier was overrunning the sun gear (see Fig. 10). As slippage occurs between the brake band 60 and the drum, the sun gear begins to rotate in the same direction as the carrier, namely, counter-clockwise as Fig. 10 is viewed. And when the sun gear tends to overrun the carrier, the overrunning clutch rollers 53 prevent such overrunning of the sun gear and, therefore, the planetary gear set is locked up in a 1:1 driving ratio. While this has been going on, oil under pressure is introduced into the cylinder 49 with the result that the plates 45—46 of the planetary lock up clutch begin to become engaged. Thus, the planetary lock up clutch is supplementary to the overrunning clutch embodying the rollers 53 and locks up the planetary set so that it will transmit torque from the traction wheels of the vehicle to the engine as well as from the engine to the traction wheels. This clutch provides the means for starting the engine by pushing or towing the vehicle, as previously described, and also provides for engine braking, in speeds involving the planetary lock up, in that when the vehicle is coasting the traction wheels drive the engine. Engine braking is also provided in the speeds where the planetary brake holds the drum stationary. Thus, engine braking is provided in all four forward speeds.

When a shift is made, as from third speed to fourth, or from first speed to second, the brake band 60 is applied with friction, accompanied by a releasing action of the planetary lock up clutch plates 45—46. As the planetary brake band 60 is applied with gradually increasing torque absorption the torque load on the overrunning clutch rollers is first gradually diminished and reduced to zero, and the sun gear then decelerated to zero speed and frictionally held there by the brake band with the planetary gear set operating in overdrive condition. This change of the planetary gear set from locked up condition to overdrive condition is not accompanied by a shift in the range selector section, in the gear changes enumerated above.

It may be shown that a shift, as just described, occurs at a predetermined percentage of the instant input torque, the actual percentage being a function of the gear ratios in the planetary set. The planetary set, being a three element machine, must follow the general law of torsional equilibrium. That is, input torque equals output torque + or − torque of the reaction element. In the above equation, two factors are known. Let it be assumed that the gear ratio of the planetary set is such that the input member or carrier makes one revolution while the ring gear or output member makes 1.5 revolutions when the reaction member is held stationary. Instant input torque$=T$ by assumption. When the brake drum or reaction element is held stationary, it is known that the output member of the illustrated planetary set rotates at $\frac{3}{2}$ input speed. Speed and torque are reciprocal so that the torque of the output member is $\frac{2}{3}T$. Therefore, $T=\frac{2}{3}T+$ or − torque of the reaction element, and to satisfy this equation, the torque of the reaction element is $+\frac{1}{3}T$, which means that the reaction torque of the sun gear is $\frac{1}{3}T$ in magnitude and in the same direction as the output torque.

Now, as a shift is being made from direct to overdrive, the band 60 becomes applied with slippage on the member 41 and the torque absorbed thereby gradually increases, thus gradually decreasing the load on the overrunning clutch rollers. When the band clutch absorbs $\frac{1}{3}$ of the torque, the load on the overrunning clutch rollers is relieved and thereafter the sun gear is gradually decelerated and brought to a stop by the clutch band 60 slipping into final engagement.

When a shift is made from overdrive to direct, the band 60 begins to release and when it will not hold $\frac{1}{3}$ of the torque, slippage occurs, the sun gear begins to rotate, and when the sun gear reaches the speed of the carrier, the planetary gear set is locked up by the overrunning clutch rollers.

The dental coupling and the overrunning clutch can thus be regarded as being similar in that each provides a definite non-slipping connection. The dental coupling locks the range selector section in its low ratio while the overrunning clutch locks the planetary set in its low ratio. The dental teeth do not become disengaged until the friction clutch in the range selector section absorbs a definite percentage of its input torque and the overrunning clutch rollers are not released from their locked condition until the planetary brake band 60 absorbs a definite percentage of the input torque. The percentage of torque required to be absorbed by the two agencies depend upon the gear ratios provided in the range selector section and in the planetary gear set.

The downshift from third speed to second speed involves a change of conditions in both the range selector section and in the planetary gear set. The friction clutch plates 94—95 are releasing and spring pressure is urging the coupler toward dental engagement with the gear 114. This movement is blocked by the blocking agencies but the head 198 has moved from position X (Fig. 20) to position Y. This movement is sufficient to withdraw the valving shoulder 305 from the relay valve 252 so that oil is introduced into the cylinder 63 to start engagement of the brake band 60. At the same time, oil is cut off from the cylinder 49 resulting in a disengaging action of the planetary lock up clutch disc plates 45—46. Again it will be noted that this change in the planetary set from direct to overdrive is taking place while the clutch discs 94—95 are slipping and, therefore, the condition of the range selector section is fluid. There is a resultant speed up of the engine and of gear 114. When the gear 114 tends to overrun the coupler the dental engagement is established and when the brake band 60 holds the sun gear stationary the transmission is in second speed.

As described above, the friction clutch discs 94—95 must absorb a determined percentage of torque in order to effect a disengagement of the teeth at the dental coupling. This is the torque delivered by the member 30 and under some conditions this torque is not constant during a range change even though the torque delivered by the engine, during a range change is fairly uniform. For purposes of illustration let it be assumed that the gearing in the planetary set and in the range selector section provides the ratio above mentioned. In second speed, the member 30 is transmitting $\frac{2}{3}$ actual input torque while the clutch band 60 has a reaction of $\frac{1}{3}$ actual input torque. Therefore, in order to bring the tooth pressure at the dental coupling to zero, the clutch plates 94—95 need only absorb $\frac{2}{3}$ of $\frac{2}{3}$ engine input torque or $\frac{4}{9}$ of actual input torque. At this instant the dental coupling becomes disengaged and the action initiates the releasing of the planetary brake band 60. As the planetary brake band clutch begins to slip and lose its torque capacity, the same gain occurs in the torque input to the range change section. In other words, torque reaction lost by the band 60 is gained at the input of the range change section. Therefore, when the planetary brake band 60 becomes disengaged and the planetary gear set is locked up at 1:1 ratio, the input torque to the range change section has changed from $\frac{2}{3}$ to full engine torque. It is preferred, that in this action, the planetary gear set changes from its over-drive condition to locked-up condition before the clutch plates 94—95 are fully engaged. Accordingly, it will be seen that while clutch plates 94—95 need absorb only $\frac{4}{9}$ of instant actual input torque to initiate the change, the clutch plates 94—95 must slip out the remaining $\frac{5}{9}$ of actual input torque before the change is complete. This introduces additional slippage and therefore promotes a smoother action.

A situation may occur where the sliding gears in the range selective section are in neutral and the no-creep brake band is applied to the carrier of the planetary gear set. If, in attempting to shift one of the gears into engagement with the gear 114, the teeth directly abut each other, engagement cannot be accomplished. Nor can the engagement be accomplished if the chamfer on the teeth is such as to tend to cause the ring gear of the planetary to rotate backwardly since the overrunning clutch prevents such backward movement. The operator may merely accelerate the engine causing the no-creep brake to slip, thus rotating the sliding gear so that it may be readily engaged. If the chamfer on the teeth is such as to tend to cause the ring gear to rotate in the usual direction of operation, that is overrun the carrier, the dental engagement may be made because this movement of the ring gear is permitted because the overrunning clutch rollers allow the sun gear to rotate freely in a backward direction.

I claim:

1. In an automatic speed change transmission adapted for the transmission of torque from the engine to the traction wheels of an automotive vehicle, a first transmission section including a planetary gear set, means for locking up the planetary gear set for the transmission of torque at a 1:1 speed ratio, friction means for engaging and holding a member of the planetary gear set at zero speed for the transmission of torque at a speed ratio higher than 1:1; a second transmission section having an input member driven by the planetary gear set, an output member, a gear train for connecting the input and output members, a dental coupling for establishing a connection through the gear train including a coupling member shiftable out of coupling position, a friction clutch for directly connecting the input and output members, the coupler being in dentally engaged position and the said one member of the planetary gear set held at zero speed in one speed ratio of the transmission, control means for initiating engagement of the friction clutch and for shifting the coupler out of dental engagement when the clutch has absorbed such percentage of the engine torque as to reduce the pressure on the dental teeth substantially to zero, a control element shiftable upon said shift of the coupler for initiating release of the friction means engaging and holding the said member of the planetary gear set at zero speed, whereby a speed change is effected in the planetary gear set during the final stages of the engagement of said clutch.

2. An automatic speed change transmission adapted for the transmission of torque from the engine to the traction wheels of an automotive vehicle, comprising in combination, a connection with the engine of the type wherein the engine may idle with the vehicle at rest and which transmits driving torque as the engine is accelerated, a first transmission section including a planetary gear set, means normally locking up the gear set for the transmission of torque at 1:1 speed ratio, a second transmission section driven by the planetary gear set having a power input member and power output member, a gear train, a dental coupling including a shiftable coupler for connecting the input and output members through the gear train for the transmission of torque at a speed ratio lower than 1:1, said coupling being normally engaged so that torque is transmitted through the transmission upon acceleration of the engine, friction means for engaging and holding one member of the planetary gear set at zero speed for the transmission of torque through the planetary gear set at a speed ratio higher than 1:1, a friction clutch for connecting the input and output members together for the transmission of torque through the second section at 1:1 speed ratio, and control means responsive to the speed of the vehicle and torque of the engine for selectively controlling the engagement and disengagement of the dental coupling and friction clutch and the engagement and disengagement of the said friction means.

3. The transmission as described in claim 2, characterized in that the engine has a throttle and the control means is hydraulic having a hydraulic pump operating with the said output member and whose pressure varies with speed, and having a master valve in the hydraulic system which actuates under the dual influence of hydraulic pressure and a spring load determined by the position of the throttle.

4. The transmission as described in claim 2, characterized in that the control means comprises a hydraulic system, an element in the system initially movable for loading the coupler for its disengagement shift, a valve in the system actuated by the element for causing an engaging action of the clutch, the coupler being arranged and constructed to shift out of dental engagement when the clutch has absorbed a percentage of the engine torque such as to reduce the load on the coupler teeth substantially to zero.

5. The transmission as described in claim 4 further characterized in that there is a valve in the hydraulic system and an actuating element movable with the coupler for operating the valve for disengaging the said friction means whereby a speed change in the planetary gear set is effected during slippage of the clutch.

6. In an automatic speed change transmission adapted for the transmission of torque from the engine to the traction wheels of an automotive vehicle, a first transmission section including a planetary gear set, means normally locking up the gear set for the transmission of torque at 1:1 speed ratio, a second transmission section driven by the planetary gear set having a power input member and power output member, a gear train, a dental coupling including a shiftable coupler for connecting the input and output members through the gear train for the transmission of torque at a speed ratio lower than 1:1, said coupling being normally engaged so that torque is transmitted through the transmission upon acceleration of the engine, friction means for engaging and holding one member of the planetary gear set at zero speed for the transmission of torque through the planetary gear set at a speed ratio higher than 1:1, a friction clutch for connecting the input and output members together for the transmission of torque through the second section at 1:1 speed ratio, and control means for selectively controlling engagement and disengagement of the dental coupling and friction clutch, and engagement and disengagement of said friction means.

7. A transmission as described in claim 6 characterized in that the control means comprises a hydraulic system with hydraulically actuated controlling elements and further characterized in that there is a valve in the system for controlling the engagement and disengagement of the friction means for the said one member of the planetary gear set, and means movable with the coupler for actuating the valve so arranged and constructed that after the coupler has moved out of dental engagement, the valve is actuated for causing release of the said friction means and so that when the coupler is shifted toward dental engaged position, the valve is actuated for engagement of said friction means prior to the establishment of the dental coupling.

8. The transmission as described in claim 6 characterized in that the control means is a hydraulic system with hydraulically actuated controlling elements, valve means in the hydraulic system for controlling engagement and disengagement of said friction means, and an element movable with the coupler to and from coupled position for actuating the valve means to thereby apply and release said friction means in timed relationship with the shift of said coupler.

9. The transmission as described in claim 8 further characterized in that there are blocking means for blocking the coupler in its movement toward dental engagement until the coupler is substantially synchronized with the part to be dentally engaged in which position of the coupler the said valve means has been actuated for the application of the friction means to the said one member of the planetary gear set.

10. A transmission as described in claim 6 characterized in that the control means has an actuating element operable to apply the friction means to the said member of the planetary gear set, and other actuating elements operable to shift the coupler into and out of coupled position and engaging and disengaging the clutch, and means movable with the coupler for controlling the operation of the said actuating element in its engagement and release of said friction means.

11. In an automatic transmission adapted for the transmission of torque from the engine to the traction wheels of an automotive vehicle, a first transmission section, said first transmission section having torque transmitting elements therein including gears, non-slipping mechanical means for connecting elements in the first section for the transmission of torque therethrough at one speed ratio, a friction clutch capable of slipping in its engaging and disengaging action for conditioning some of the elements for the transmission of torque therethrough at a different speed ratio, a second transmission section in tandem with the first transmission section and having torque transmitting elements therein including gears, non-slipping mechanical means for connecting elements in the second section for the transmission of torque therethrough at one speed ratio, a friction clutch capable of slipping in its engaging and disengaging action for conditioning some of the elements in the second section for the transmission of torque therethrough at a different speed ratio, and control means for selectively causing engagement and disengagement of the said mechanical means and the said friction clutches.

12. In a device for the transmission of torque from an internal combustion engine of an automotive vehicle to the traction wheels thereof, the combination of a speed change transmission having a planetary gear set including two gear members and a pinion carrier member and having other gears at least one of which is shiftable into and out of engagement with another and having a final output member for connection to the traction wheels, coupling means between two of the planetary gear set members operable to couple said members together and constructed and arranged to permit some relative movement between said two members, a fluid coupling between the engine and the transmission for driving one member of the planetary gear set, said fluid coupling being of the type that delivers driving torque when operating at speeds above engine idling speed and which, while slipping at low operating speeds so that the engine may idle, delivers light residual torque sufficient to cause the vehicle to creep, friction means normally applicable and capable of absorbing the light residual torque to hold the said one member of the planetary gear set stationary and thereby prevent vehicle creep, said friction means slipping when the engine is operated above idling speed, said slipping action and the relative movement permitted by said coupling means facilitating movement of the shiftable gear into engagement with said other gear and means operated with movement of the final output member for releasing and holding the friction means released.

13. In a device for the transmission of torque from an internal combustion engine of an automotive vehicle to the traction wheels thereof, the combination of a speed change transmission having a planetary gear set including two gear members and a pinion carrier member and having other gears at least one of which is shiftable into and out of engagement with another and having a final output member for connection to the traction wheels, coupling means between two of the planetary gear set members operable to couple said members together and constructed and arranged to permit some relative movement between said two members, a fluid coupling between the engine and the transmission for driving one member of the planetary gear set, said fluid coupling being of the type that delivers driving torque when operating at speeds above engine idling speed and which, while slipping at low operating speeds so that the engine may idle, delivers light residual torque sufficient to cause the vehicle to creep, spring actuated friction means applicable to said one member of the planetary set having sufficient torque capacity to absorb the light residual torque to thereby prevent vehicle creep, said friction means slipping when the engine is operated above idling speed, said slipping action and the relative movement permitted between said coupling means facilitating the movement of the shiftable gear into engagement with said other gear and hydraulic means operated by the final output member for releasing and holding released the spring actuated friction means from the said one member of the planetary gear set.

14. In a device for the transmission of torque from an internal combustion engine of an automotive vehicle to the traction wheels thereof, the combination of a speed change transmission having a planetary gear set including two gear members and a pinion carrier member and having other gears at least one of which is shiftable into and out of engagement with another and having a final output member for connection to the traction wheels, coupling means between two of the planetary gear set members operable to couple said members together and constructed and arranged to permit some relative movement between said two members, a fluid coupling including an impeller and a runner between the engine and the transmission for driving one member of the planetary gear set, said fluid coupling being of the type that delivers driving torque when operating at speeds above engine idling speed and which, while slipping at low operating speeds so that the engine may idle, delivers light residual torque sufficient to cause the vehicle to creep, friction means normally applied to the runner and capable of absorbing substantially only said residual torque to thereby hold the runner stationary and prevent vehicle creep, said friction means slipping when the engine is operated above idling speeds, said slipping action and the relative movement permitted by said coupling means facilitating movement of the shiftable gear into engagement with said other gear, and means operable with the operation of the final output member for releasing and holding the friction means released from the runner.

15. The construction as described in claim 14 characterized in that there is spring means for normally holding the friction means applied to the runner and hydraulic means including a pump operable with the operation of the final output member and a fluid motor for releasing the friction means and holding the friction means released against the action of the spring means.

ERNEST E. WEMP.

REFERENCES CITED

The following references are of record in the file of this patent:

UNITED STATES PATENTS

| Number | Name | Date |
|---|---|---|
| 1,842,798 | Raven | Jan. 26, 1932 |
| 2,008,231 | Vincent | July 16, 1935 |
| 2,103,540 | Livermore | Dec. 28, 1937 |
| 2,193,305 | Thompson | Mar. 12, 1940 |
| 2,229,336 | Neracher | Jan. 21, 1941 |
| 2,232,797 | Neracher | Feb. 25, 1941 |
| 2,245,017 | Sinclair | June 10, 1941 |
| 2,251,464 | Neracher | Aug. 5, 1941 |
| 2,281,118 | Smirl | Apr. 28, 1942 |
| 2,332,593 | Nutt et al. | Oct. 26, 1943 |
| 2,373,453 | Brunken | Apr. 10, 1945 |
| 2,427,653 | Banker | Sept. 23, 1947 |